(12) United States Patent
Ito

(10) Patent No.: US 10,139,769 B2
(45) Date of Patent: Nov. 27, 2018

(54) IMAGE FORMING APPARATUS AND PROGRAM WITH TWO SNAPSHOT ACQUISITION PROCESSES

(71) Applicant: KONICA MINOLTA, INC., Chiyoda-ku, Tokyo (JP)

(72) Inventor: Hiroyasu Ito, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/379,604

(22) Filed: Dec. 15, 2016

(65) Prior Publication Data
US 2017/0176917 A1    Jun. 22, 2017

(30) Foreign Application Priority Data

Dec. 17, 2015 (JP) .................. 2015-246775

(51) Int. Cl.
*G03G 15/00* (2006.01)

(52) U.S. Cl.
CPC ......... *G03G 15/80* (2013.01); *G03G 15/5004* (2013.01); *G03G 15/5012* (2013.01); *G03G 2215/00126* (2013.01); *G03G 2215/00983* (2013.01); *Y02D 10/159* (2018.01)

(58) Field of Classification Search
CPC ............... G03G 15/80; G03G 15/5012; G03G 2215/00983; G03G 15/5004; G06F 1/3203; G06F 1/3228; G06F 1/3284; H04N 1/00233; H04N 1/00885; H04N 1/00891; H04N 1/00896; H04N 1/00928
See application file for complete search history.

(56) References Cited

FOREIGN PATENT DOCUMENTS

JP        09329998 A    * 12/1997
JP        2013-222394 A   10/2013

* cited by examiner

*Primary Examiner* — David M. Gray
*Assistant Examiner* — Laura Roth
(74) *Attorney, Agent, or Firm* — Buchanan Ingersoll & Rooney PC

(57) ABSTRACT

An image forming apparatus that avoids adverse effects after the next start-up when the snapshot acquisition process is performed in a power saving state. The image forming apparatus executes a first snapshot acquisition process storing save target information for a first device group, and executes a second snapshot acquisition process storing save target information for a second device group.

22 Claims, 16 Drawing Sheets

IMAGE FORMING APPARATUS AND PROGRAM WITH TWO SNAPSHOT ACQUISITION PROCESSES

The entire disclosure of Japanese Patent Application No. 2015-246775 filed on Dec. 17, 2015 including description, claims, drawings, and abstract are incorporated herein by reference in its entirety.

BACKGROUND OF THE INVENTION

Field of the Invention

The present invention relates to an image forming apparatus such as an MFP (Multi-Function Peripheral) and a technology related thereto.

Description of the Related Art

There is a fast start-up technology (also referred to as the hibernate start-up technology) that enables a user to use the function of the MFP in a short time when a main power switch of an MFP is turned on (ON) (see JP 2013-222394 A).

In the fast start-up technology, the supply of power is not stopped immediately after the operation of turning off the main power switch, but a period during which the supply of power is continued even after the turn-off operation (a power supply continuing period) is provided to perform a process of storing apparatus state information (also referred to as save target information) in the period. More specifically, in preparation for the next time the main power switch is turned on, a process of storing apparatus state information at the time when the main power switch is turned off (OFF) (data in RAM of a controller, and stored data in a register of each processing unit, and the like) in a nonvolatile storage unit (also referred to as a snapshot acquisition process). The next time the main power switch is turned on, the apparatus state information (snapshot data) acquired in the previous snapshot acquisition process is used. Consequently, the MFP can return to the working state (specifically, a state where a job can be executed (a ready state)) fast.

For example, electric power stored in a capacitor or the like in the MFP is used to perform the operation after the main power switch turn-off operation The MFP makes a transition to a sleep state (power saving state) where power is stopped being supplied to some processing circuits and the like based on, for example, a request to reduce power consumption, when a certain period of non-operation passes in the working state.

If the main power switch is turned off in the sleep state (power saving state), when the above-mentioned snapshot process is performed as-is, the following problem can occur.

For example, if the apparatus state information including data of an operation panel to which the power supply is being stopped is acquired as the snapshot data, and such snapshot data is developed as it is after the next startup of the apparatus, the operation panel ends up restoring the state during the stoppage of power supply (that is, the state where no screens are displayed).

In order to avoid such a circumstance, one idea is for the MFP to initialize the operation panel once and then acquire the snapshot data including the apparatus state information of the operation panel when the main power switch is turned off in the sleep state. If the operation panel is initialized once, the apparatus state information representing the state where an initial screen is displayed on the operation panel is acquired as the snapshot data. Therefore, the snapshot data is developed after the next start-up of the apparatus to enable the display of the normal screen (initial screen) on the operation panel.

In this manner, when the main power switch is turned off in the sleep state (power saving state), it is preferable that the MFP reinitialize processing circuits that are currently being stopped being supplied power once and then perform the snapshot acquisition process.

However, the reinitialization of all the processing circuits that are being stopped being supplied power may take a considerable time. Especially when the capacity of the capacitor in the MFP is relatively small, the power supply period by the capacitor may end without waiting for the completion of the snapshot acquisition process.

When the power supply by the capacitor ends during the creation of snapshot data, incomplete snapshot data is created. If the incomplete snapshot data is used at the next start-up, it adversely affects the operation of the MFP after the next start-up.

SUMMARY OF THE INVENTION

Hence, an object of the present invention is to provide a technology capable of avoiding adverse effects on the operation of an image forming apparatus after the next start-up even when a snapshot acquisition process is performed in a sleep state (power saving state).

To achieve the abovementioned object, according to an aspect, an image forming apparatus reflecting one aspect of the present invention comprises: a nonvolatile storage device configured to store save target information related to the image forming apparatus as snapshot data in a power supply continuing period from a time of a power-off operation to a time of interruption of power supply; and a control unit configured to reduce a start-up time by means of the snapshot data upon the next power-on operation being performed after the power-off operation, and accordingly start up the image forming apparatus fast, wherein the control unit upon the power-off operation being performed in a first working state of the image forming apparatus, executes a first snapshot acquisition process of storing save target information related to a first device group of the image forming apparatus as the snapshot data in the storage device, and upon the power-off operation being performed in a second working state where power consumption is less than the first working state due to the halt of two or more devices in the first device group, after an initialization process is executed on some of the two or more devices halting at the time of the power-off operation, executes a second snapshot acquisition process of storing save target information related to a second device group narrowed down from the first device group, the second device group including the some devices, as the snapshot data in the storage device.

According to an invention of Item. 2, in the image forming apparatus of Item. 1, the control unit preferably determines the second device group such that a total of a sum of times required for the initialization process on the some of the two or more devices and a sum of times required for the process of acquiring the save target information related to the devices of the second device group falls within a period length of the power supply continuing period.

According to an invention of Item. 3, in the image forming apparatus of Item. 2, the control unit preferably selects one combination of a plurality of combinations, related to target device groups for the second snapshot acquisition process, where a total time of a sum of times required for the initialization process on at least one device targeted for the initialization process in a target device group included in each combination and a sum of times required for the process of acquiring save target information of the target device group for the second snapshot acquisition process is specified and associated, the one combination having the total time falling within the period length of the power supply continuing period, and determines a device group included in the selected combination to be the second device group.

According to an invention of Item. 4, in the image forming apparatus of Item. 2 or 3, the image forming apparatus preferably further comprises a power storage unit configured to supply electric power stored until the time of the power-off operation to each unit of the image forming apparatus in the power supply continuing period after the time of the power-off operation, wherein the control unit estimates a period length of a power holdable period being a period during which the power storage unit is able to supply power, and determines the period length of the power supply continuing period based on the period length of the power holdable period.

According to an invention of Item. 5, in the image forming apparatus of Item. 4, the control unit preferably determines the second device group based on ranked device lists of a plurality of levels where as the ranking decreases to a relatively lower place, a relatively smaller number of devices are specified as a target device group.

According to an invention of Item. 6, in the image forming apparatus of Item. 5, the control unit preferably upon it being determined that the period length of the power holdable period is longer than a total time of a sum of times required for the initialization process on halting devices of a target device group specified in a high-ranking device list being a device list with a relatively high ranking among the device lists of the plurality of levels and a sum of times required for the process of acquiring save target information of the target device group, and a difference between the period length of the power holdable period and the total time is larger than a predetermined level, determines the target device group specified in the high-ranking device list to be the second device group, and also determines the halting devices of the target device group specified in the higher-ranking device list to be the some devices, and upon the difference between the period length of the power holdable period and the total time being determined to be smaller than the predetermined level, determines a target device group specified in a lower-ranking device list being a device list with a lower ranking than the high-ranking device list among the device lists of the plurality of levels to be the second device group, and also determines halting devices of the target device group specified in the lower-ranking device list to be the some devices.

According to an invention of Item. 7, in the image forming apparatus of any one of Items. 2 to 6, the control unit preferably includes a measurement unit configured to measure an initialization required time being a time required for initialization of each of the some devices, wherein the control unit obtains a sum of the times required for the initialization process on the some devices based on the initialization required times measured by the measurement unit upon another power-off operation performed before the power-off operation being performed in the second working state.

According to an invention of Item. 8, in the image forming apparatus of any one of Items. 2 to 6, the control unit preferably includes a measurement unit configured to measure an acquisition process required time being a time required for the process of acquiring the save target information of each device of the second device group, wherein the control unit obtains a sum of the times required for the process of acquiring the save target information related to the second device group based on the acquisition process required times measured by the measurement unit upon another power-off operation performed before the power-off operation being performed in the second working state.

According to an invention of Item. 9, in the image forming apparatus of any one of Items. 1 to 8, the second device group is preferably a device group excluding remaining devices, exclusive of the some of the two or more devices, from the first device group.

According to an invention of Item. 10, in the image forming apparatus of Item. 9, at the time of the next power-on operation after the power-off operation is performed in the second working state, the control unit preferably develops, in the image forming apparatus, the snapshot data acquired in the second snapshot acquisition process on the second device group, and also executes the initialization process on the remaining devices.

According to an invention of Item. 11, in the image forming apparatus of Item. 1, the image forming apparatus preferably further comprises a power storage unit configured to supply electric power stored until the time of the power-off operation to each unit of the image forming apparatus in the power supply continuing period after the time of the power-off operation, wherein the control unit preferably estimates a period length of a power holdable period being a period during which the power storage unit is able to supply power, and even in a case where the power-off operation is performed in the second working state, upon the initialization process on all of the two or more devices halting at the time of the power-off operation, and a third snapshot acquisition process of storing save target information related to all the devices of the first device group as the snapshot data in the storage device being determined to be able to be finished within the power holdable period, executes the initialization process on the two or more devices and the third snapshot acquisition process on the first device group, instead of the initialization process on the some devices and the second snapshot acquisition process on the second device group.

To achieve the abovementioned object, according to an aspect, a non-transitory recording medium storing a computer readable program reflecting one aspect of the present invention causes a computer built in an image forming apparatus to execute the steps of: a) storing save target information related to the image forming apparatus as snapshot data in a nonvolatile storage device in the image forming apparatus in a power supply continuing period from a time of a power-off operation to a time of interruption of power supply; and b) reducing a start-up time by means of the snapshot data upon the next power-on operation being performed after the power-off operation, and accordingly starting up the image forming apparatus fast, wherein the step a) includes the steps of: a-1) upon the power-off operation being performed in a first working state of the image forming apparatus, executing a first snapshot acquisition process of storing save target information related to a first device group of the image forming apparatus as the snapshot data in the storage device; and a-2) upon the power-off operation being performed in a second working state where power consumption is less than the first working state due to the halt of two or more devices in the first device group, after an initialization process is executed on some of the two or more devices halting at the time of the power-off operation, executing a second snapshot acquisition process of storing save target information related to a second device group narrowed down from the first device group, the second device group including the some devices, as the snapshot data in the storage device.

According to an invention of Item. 13, in the non-transitory recording medium storing a computer readable program of Item. 12, the step a-2) preferably includes a step of a-2-1) determining the second device group such that a total of a sum of times required for the initialization process on the some of the two or more devices and a sum of times required for the process of acquiring the save target information related to the devices of the second device group falls within a period length of the power supply continuing period.

According to an invention of Item. 14, in the non-transitory recording medium storing a computer readable program of Item. 13, the step a-2-1) preferably includes the steps of: selecting one combination of a plurality of combinations, related to target device groups for the second snapshot acquisition process, where a total time of a sum of times required for the initialization process on at least one device targeted for the initialization process in a target device group included in each combination and a sum of times required for the process of acquiring save target information of the target device group for the second snapshot acquisition process is specified and associated, the one combination having the total time falling within the period length of the power supply continuing period; and determining a device group included in the selected combination to be the second device group.

According to an invention of Item. 15, in the non-transitory recording medium storing a computer readable program of Item. 13 or 14, the step a-2) preferably further includes a step of a-2-2) estimating a period length of a power holdable period being a period during which a power storage unit of the image forming apparatus is able to supply power to each unit of the image forming apparatus, and determining the period length of the power supply continuing period based on the period length of the power holdable period.

According to an invention of Item. 16, in the non-transitory recording medium storing a computer readable program of Item. 15, the step a-2-2) preferably includes determining the second device group based on ranked device lists of a plurality of levels where as the ranking decreases to a relatively lower place, a relatively smaller number of devices are specified as a target device group.

According to an invention of Item. 17, in the non-transitory recording medium storing a computer readable program of Item. 16, the step a-2-2) preferably includes upon it being determined that the period length of the power holdable period is longer than a total time of a sum of times required for the initialization process on halting devices of a target device group specified in a high-ranking device list being a device list with a relatively high ranking among the device lists of the plurality of levels and a sum of times required for the process of acquiring save target information of the target device group, and a difference between the period length of the power holdable period and the total time is larger than a predetermined level, determining the target device group specified in the high-ranking device list to be the second device group, and also determining the halting devices of the target device group specified in the higher-ranking device list to be the some devices, and upon the difference between the period length of the power holdable period and the total time being determined to be smaller than the predetermined level, determining a target device group specified in a lower-ranking device list being a device list with a lower ranking than the high-ranking device list among the device lists of the plurality of levels to be the second device group, and also determining halting devices of the target device group specified in the lower-ranking device list to be the some devices.

According to an invention of Item. 18, in the non-transitory recording medium storing a computer readable program of any one of Items. 13 to 17, the program preferably causes the computer to further execute a step of c) upon another power-off operation performed before the power-off operation in the step a) being performed in the second working state, measuring an initialization required time being a time required for initialization of each of the some devices, wherein the step a-2) preferably includes a step of a-2-3) obtaining a sum of the times required for the initialization process on the some devices based on the initialization required times measured in the step c).

According to an invention of Item. 19, in the non-transitory recording medium storing a computer readable program of any one of Items. 13 to 18, the program preferably causes the computer to further execute a step of d) upon another power-off operation performed before the power-off operation in the step a) being performed in the second working state, measuring an acquisition process required time being a time required for the process of acquiring save target information of each device of the second device group, wherein the step a-2) preferably includes a step of a-2-4) obtaining a sum of the times required for the process of acquiring the save target information related to the second device group based on the acquisition process required times measured in the step d).

According to an invention of Item. 20, in the non-transitory recording medium storing a computer readable program of any one of Items. 12 to 19, the second device group is preferably a device group excluding remaining devices, exclusive of the some of the two or more devices, from the first device group.

According to an invention of Item. 21, in the non-transitory recording medium storing a computer readable program of Item. 20, the step b) preferably includes a step of developing, in the image forming apparatus, the snapshot data acquired in the second snapshot acquisition process on the second device group, and also executing the initialization process on the remaining devices, at the time of the next power-on operation after the power-off operation is performed in the second working state.

According to an invention of Item. 22, in the non-transitory recording medium storing a computer readable program of Item. 12, the step a-2) preferably includes estimating a period length of a power holdable period being a period during which a power storage unit of the image forming apparatus is able to supply power to each unit of the image forming apparatus, and even in a case where the power-off operation is performed in the second working state, upon the initialization process on all of the two or more devices halting at the time of the power-off operation, and a third snapshot acquisition process of storing save target information related to all the devices of the first device group as the snapshot data in the storage device being determined to be able to be finished within the power holdable period, and executing the initialization process on the two or more devices and the third snapshot acquisition process on the first device group, instead of the initialization process on the some devices and the second snapshot acquisition process on the second device group.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

<1. First Embodiment>
<1-1. Apparatus Configuration>

Figure 1:
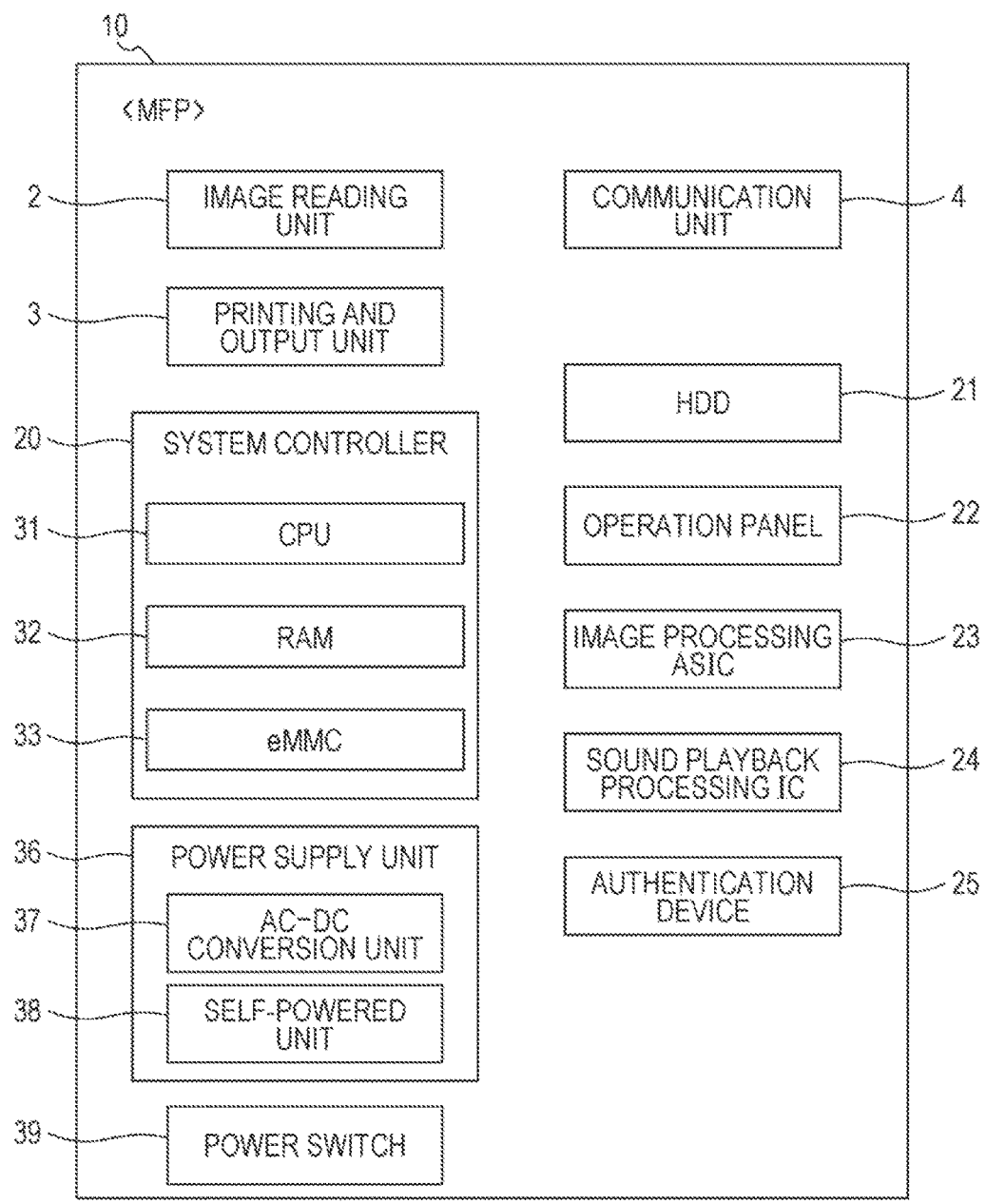
FIG. 1 is a diagram illustrating functional blocks of an MFP (image forming apparatus)
Figure 2:
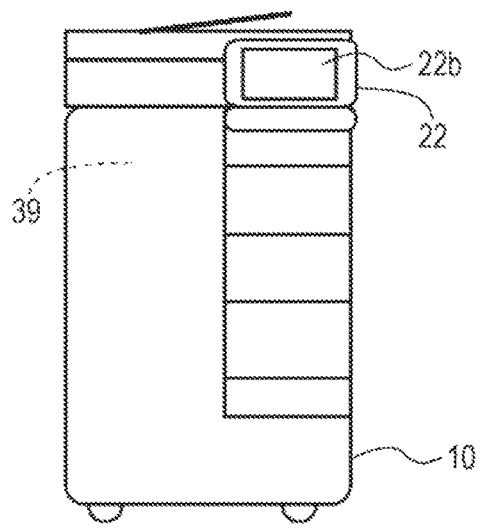
FIG. 2 is an external view of the MFP.

FIG. 1 is a diagram illustrating functional blocks of an image forming apparatus 10. An MFP (Multi-Function Peripheral) is illustrated by example as the image forming apparatus 10. Moreover, FIG. 2 is an external view of the MFP 10.

The MFP 10 is an apparatus including a scan function, a copy function, a facsimile function, and a box storage function (also referred to as the multi-function peripheral). Specifically, as illustrated in the functional block diagram of FIG. 1, the MFP 10 includes an image reading unit 2, a printing and output unit 3, a communication unit 4, a system controller 20, an HDD (hard disk drive) 21, an operation panel unit 22, an image processing ASIC 23, an sound playback processing IC 24, an authentication device 25, and a power supply unit 36. These units are operated in combination to achieve various functions.

The image reading unit 2 is a processing unit that optically reads (that is, scans) an original placed at a predetermined position in the MFP 10 to generate image data of the original (also referred to as the original image or scanned image). The image reading unit 2 is also referred to as the scanning unit.

The printing and output unit 3 is an output unit that prints an image on various media such as paper based on data on a print target, and outputs it.

The communication unit 4 is a processing unit that can perform facsimile communication via a public line and the like. Furthermore, the communication unit 4 can also perform communication (network communication) via a communication network.

The HDD (hard disk drive) 21 is a nonvolatile storage device (storage unit) having a relatively large capacity, and can save large data such as images.

The operation panel unit 22 is an operating unit including a touchscreen 22b at a front thereof as also illustrated in FIG. 2. The touchscreen 22b is configured integrating various sensors and the like in a liquid crystal display panel, and can display various kinds of information and also accept the input of various operations from an operator. In other words, the touchscreen 22b is a display unit that displays various kinds of information and also an operation input unit that accepts the input of an operation from a user.

The image processing ASIC (application specific integrated circuit) 23 is an integrated circuit for image processing. The image processing ASIC 23 can execute various types of image processing (γ adjustment processing, tone processing, image compression processing, and the like) on image data.

The sound playback processing IC 24 is an integrated circuit for controlling sound output. The sound playback processing IC 24 can perform, for example, sound output processing on an audio guide for a user.

The authentication device 25 is an authentication device (user authentication device) connected to a main body of the MFP 10 in USB connection mode or the like. Devices of various user authentication methods such as a card authentication method and a vein authentication method can be used as the authentication device 25.

The system controller 20 is a control device that is built in the MFP 10 and performs overall control of the MFP 10. The system controller 20 is configured as a computer system including a CPU 31 and various semiconductor memories (a volatile memory such as a RAM 32 and a nonvolatile memory such as an eMMC (embedded Multi Media Card) 33). The system controller 20 executes a predetermined software program (hereinafter also simply referred to as the program) stored in the eMMC 33 in the CPU 31; accordingly, the program enables various processing units to function. Moreover, the program (specifically, a program module group) may be installed in the MFP 10 via a communication network. Alternatively, the program may be recorded in a portable recording medium such as a USB memory, read out from the recording medium, and installed in the MFP 10.

Figure 3:
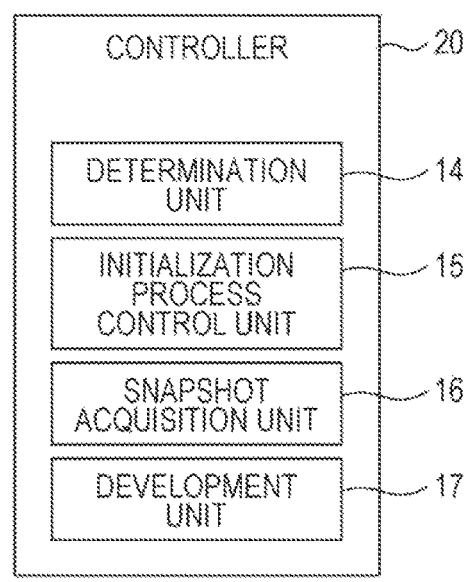
FIG. 3 is a diagram illustrating processing units caused by the execution of a program to function.

Specifically, as illustrated in FIG. 3, the system controller 20 executes the program; accordingly, the program enables various processing units including a determination unit 14, an initialization process control unit 15, a snapshot acquisition unit 16, and a development unit 17 to function.

The determination unit 14 is a processing unit that determines a target device (target processing unit) in the snapshot acquisition process.

The initialization process control unit 15 is a processing unit that executes an initialization process of each device of the MFP 10. As described below, the initialization process control unit 15 initializes, for example, a device in a halt state (a state where the supply of power is being stopped or suppressed) among devices targeted for the snapshot process.

The snapshot acquisition unit 16 is a processing unit that acquires, as snapshot data, apparatus use information (information to be used by the apparatus 10 (inclusive of its devices)) related to a processing unit (device) targeted for the snapshot acquisition process. The snapshot acquisition unit 16 stores the apparatus use information related to each unit of the MFP 10 as "snapshot data" in the eMMC 33. The apparatus use information is also referred to as save target information since it is information targeted for a saving process (described below).

At the time of the next power-on operation after a power-off operation is performed on the MFP 10, the development unit 17 develops the snapshot data acquired in the snapshot acquisition process immediately after the power-off operation in the MFP 10.

Moreover, the MFP 10 is also provided with a main power switch 39. The main power switch 39 (the power switch) is a switch for switching the MFP 10 between the on (ON) state and the off (OFF) state. The main power switch 39 is provided to the main body, which is covered with an openable cover member (the inside of the cover member), of the MFP 10 to, for example, prevent misoperation.

The power supply unit 36 can supply power from an AC power supply (specifically, power that has undergone a conversion process by an AC-DC conversion unit 37) to each unit of the MFP 10. Moreover, the power supply unit 36 can also supply power stored in a self-powered unit 38 described below to each unit of the MFP 10. The power supply unit 36 can switch the source of power supply between the AC-DC conversion unit 37 and the self-powered unit 38 as appropriate. For example, the power supply unit 36 supplies power from the AC-DC conversion unit 37 to the MFP 10 in the working state or the like of the MFP 10, and supplies power from the self-powered unit 38 to the MFP 10 during a power supply continuing period P1 (described below) immediately after the turn-off operation of the main power switch 39 of the MFP 10. Moreover, the power supply unit 36 interrupts the supply of power from the AC-DC conversion unit 37 or the self-powered unit 38 to the system controller 20 and the like of the MFP 10 by turning off an electromagnetic relay.

The self-powered unit 38 is a storage battery (DC power supply) configured including a capacitor with a relatively large capacity. The self-powered unit 38 can supply power that has been stored until the time of the power-off operation to each unit of the MFP 10 during a predetermined period after the time of the power-off operation.

<1-2. Operation>
<States of the MFP (Ready State, Power Saving State, Etc.)>

The MFP 10 has at least two working states Q1 and Q2. One of the working states, Q1, is a normal working state and a state of waiting for various processes (standby state). The standby state Q1 is a state where each function of the MFP 10 can be used, that is, a state where a job can be executed (a state where preparation for the execution of a job is complete), and is also expressed as a ready (READY) state. The other working state Q2 is a working state where the power consumed is less than the standby state (ready state) Q1, and is also expressed as a power saving state. The power saving state Q2 is also expressed as a sleep (SLEEP) state. The sleep state Q2 is achieved by, for example, stopping or suppressing the supply of power to two or more devices (processing circuits) to halt the two or more devices.

Figure 4:
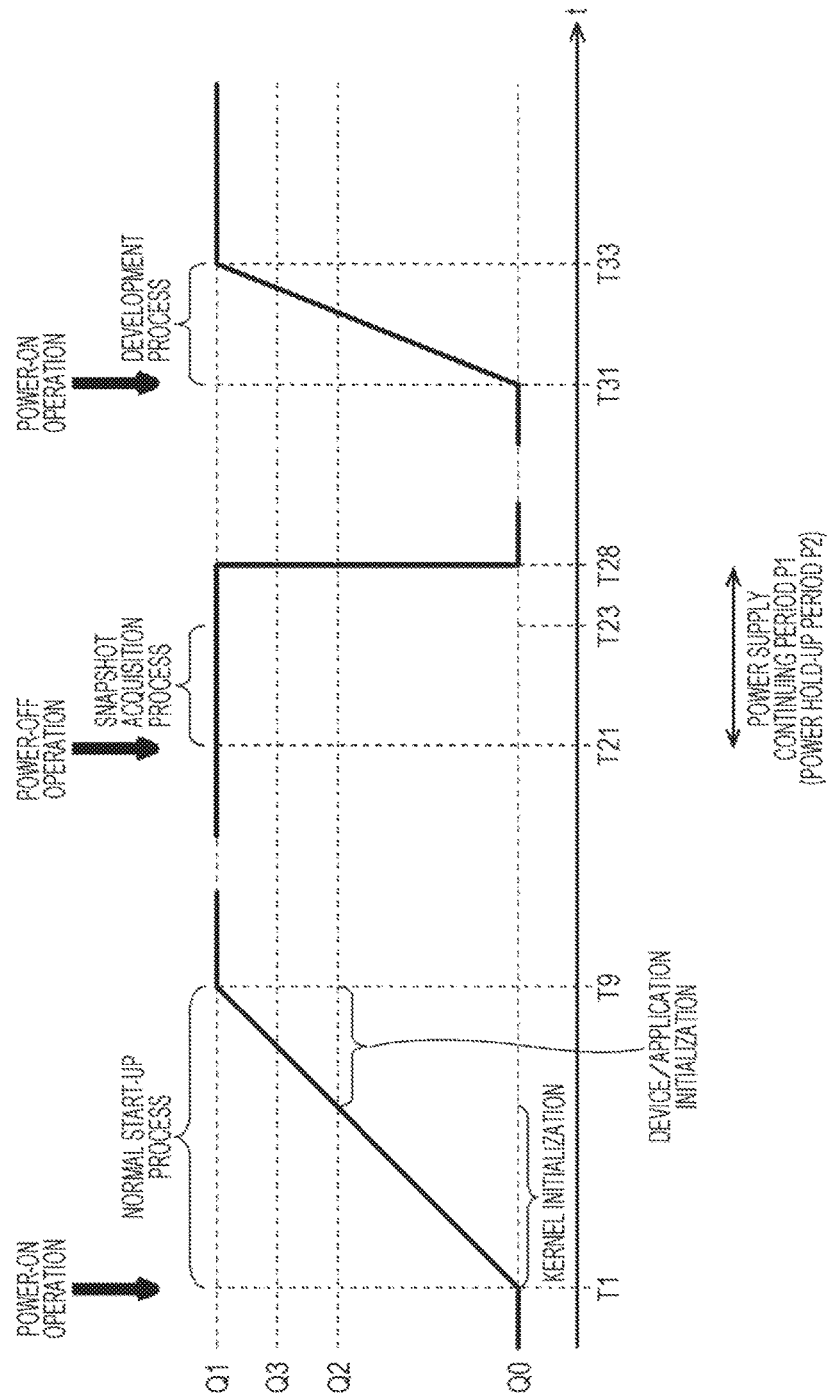
FIG. 4 is a conceptual diagram illustrating the operation and the like of when a power-off operation is performed in a ready state.
Figure 5:
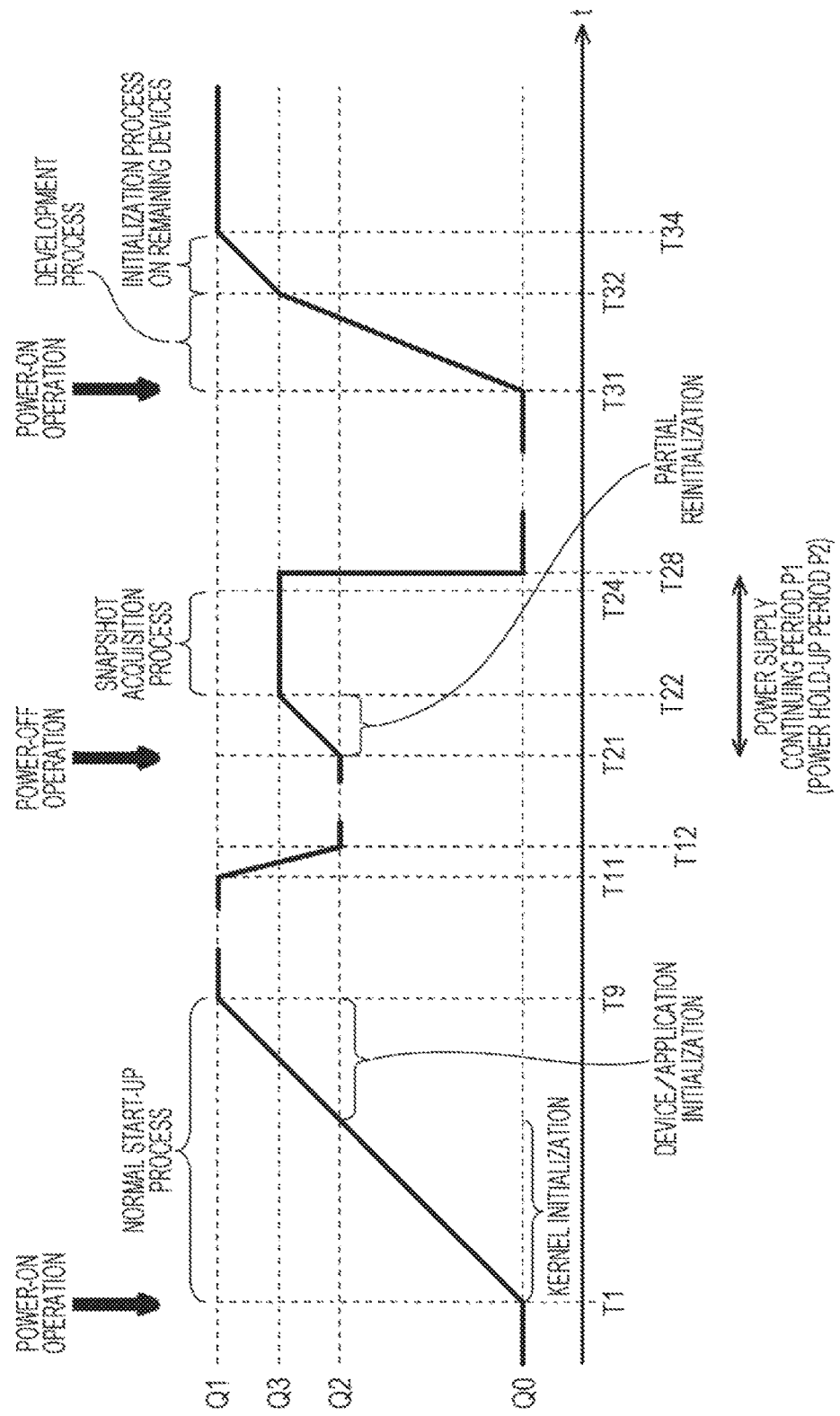
FIG. 5 is a conceptual diagram illustrating the operation and the like of when the power-off operation in a sleep state.

For example, as illustrated in FIGS. 4 and 5, when the main power switch 39 is turned on in a power-off state Q0 (time T1), power is supplied to the hardware components of the MFP 10, and the MFP 10 makes a transition from the power-off state Q0 to the ready state Q1 (time T9). After a certain period of non-operation passes in the ready state Q1, the MFP 10 stops the supply of power to two or more devices (processing circuits) (for example, devices 21 to 25) to make a transition to the sleep state (power saving state) Q2 as illustrated in FIG. 5. The transition to the sleep state Q2 enables needless power consumption to be suppressed.

<Regarding Fast Start-up upon Turning on the Power Again>

The MFP 10 employs a fast start-up technology (also referred to as the hibernate start-up technology or the like) that enables a user to use the functions of the MFP in a short time when the turn-on operation (also referred to as the main power turn-on operation or simply power-on operation) of the main power switch 39 is performed.

In the fast start-up technology, in preparation for the next time the main power switch 39 is turned on, when the turn-off operation of the main power switch 39 (also referred to as the main power turn-off operation or simply power-off operation) is performed, a process of saving (storing) apparatus use information (save target information) is performed in the power supply continuing period P1 after the time of the power-off operation. Specifically, a process of storing (storing) save target information of the MFP 10 (such as data in the RAM 32 of the controller, and data in a register (and/or memory) of each processing unit) in the nonvolatile storage unit (eMMC 33) (also referred to as the snapshot acquisition process) is performed. The next time the main power switch 39 is turned on, the data (snapshot data) acquired by the previous snapshot acquisition process is used, and accordingly the MFP 10 can return to the ready state Q1 fast (start up fast).

Specifically, as illustrated in FIGS. 4 and 5, the MFP 10 stores save target information related to the MFP 10 as the snapshot data in the eMMC 33 (the nonvolatile memory) in the power supply continuing period P1 from the time of the power-off operation (power shutdown operation) (for example, time T21) to time T28 of the interruption of the power supply in response to the power-off operation. When the next power-on operation is performed after the power-off operation (from time T31), the start-up time is reduced by means of the snapshot data; accordingly, the MFP 10 starts up fast.

In the embodiment, a different operation is executed depending on in which of the ready state Q1 and the sleep state Q2 the power-off operation (specifically, the main power turn-off operation of the MFP 10 by the main power switch 39) is performed.

FIG. 4 is a diagram illustrating the operation of when the power-off operation is performed by the main power switch 39 on the MFP 10 in the ready state Q1, and the operation of when the power-on operation is subsequently performed. On the other hand, FIG. 5 is a diagram illustrating the operation of when the power-off operation is performed in the sleep state Q2, and the operation of when the power-on operation is subsequently performed.

<Operation from the Ready State (Standby State) Q1>

Firstly, the operation of when the power-off operation is performed in the ready state Q1 and the operation of when the power-on operation is subsequently performed are described below with reference to FIG. 4.

As illustrated in FIG. 4, when the power-on operation is performed at time T1, and the normal start-up process is performed, the MFP 10 makes a transition to the ready state Q1 (for example, time T9).

When the power-off operation by the main power switch 39 is subsequently accepted in the ready state Q1 (time T21), the MFP 10 executes a first snapshot acquisition process. Specifically, the MFP 10 acquires, as the snapshot data, save target information related to a first device group (all target devices 20 to 25 (see, for example, FIG. 8)), and stores the snapshot data in the eMMC 33 (times T21 to T23).

Figure 8:
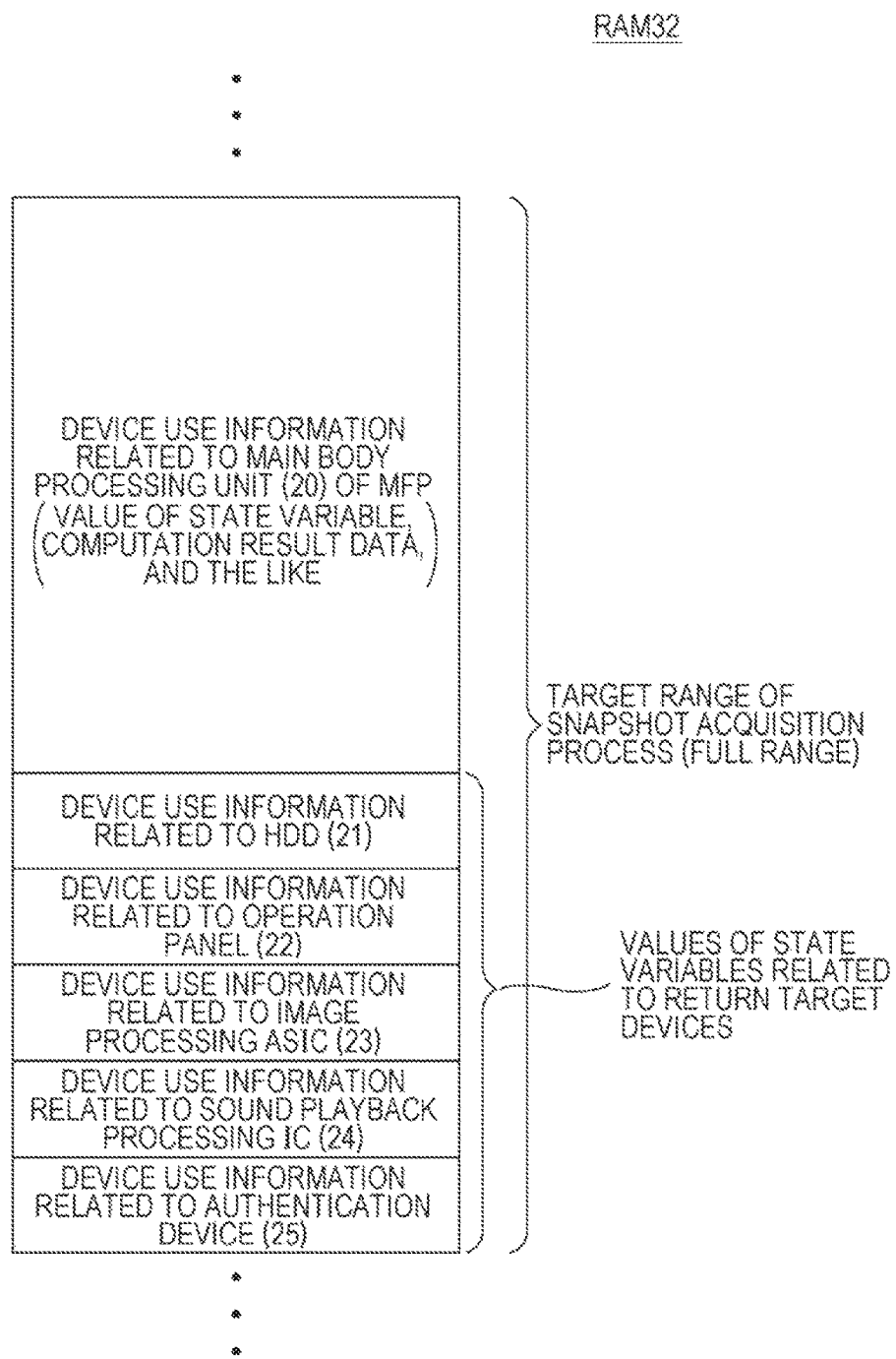
FIG. 8 is a diagram illustrating a memory map in a RAM of the MFP.

More specifically, as illustrated in FIG. 8, data targeted for the snapshot acquisition process includes data stored in, for example, the RAM 32 to be used by the system controller 20 (also referred to as the main body processing unit) of the MFP 10 (the apparatus use information (save target information)). The data targeted for the snapshot acquisition process includes, for example, the value of a state variable indicating an option configuration or the like of the MFP 10, and image data in which the option configuration is reflected. The save target information in the system controller 20 of the MFP 10 is transferred from, for example, the RAM 32 to the eMMC 33 and stored therein. FIG. 8 is a diagram illustrating part of a memory map related to the RAM 32.

Moreover, the data targeted for the snapshot acquisition process can also include save target information related to each of the other hardware processing units (for example, the devices 21 to 25) (the apparatus use information (data to be used by the hardware processing unit (such as the value of a state variable))). The save target information related to the hardware processing unit (for example, each of the devices 21 to 25) (for example, data in the register (and/or memory) of the hardware processing unit) is copied (transferred and stored) once from the hardware processing unit to the RAM 32, and then further transferred and stored in the eMMC 33.

For example, the MFP 10 develops information stored in the register in the image processing ASIC 23, the memory in the image processing ASIC 23, and the like (image adjustment parameters (such as a γ value)) once in the RAM 32, and saves the data developed in the RAM 32 in the eMMC 33. The same shall apply to, for example, information in the register in the sound playback processing IC 24, and information in the memory in the sound playback processing IC 24. Furthermore, similarly, the MFP 10 develops information stored in, for example, the register and memory in the operation panel unit 22 (information indicating screen data of a display screen, a screen ID of the display screen, the lighting states of various LEDs, and the like) once in the RAM 32, and saves the data developed in the RAM 32 in the eMMC 33. Data related to the other devices (save target information) is similarly saved (saved) in the eMMC 33. The save target information of each device includes, for example, the value of a state variable indicating the apparatus state, and/or various kinds of data to be used by the main body processing unit.

In this manner, when the power-off operation is performed by the main power switch 39, the process of storing (saving) the save target information related to the MFP 10 in the nonvolatile storage unit (the eMMC 33) (the snapshot acquisition process) is performed.

The supply of power is not interrupted immediately after the time of the power-off operation, but the supply of power is continued over the power supply continuing period P1. Specifically, at the time of the power-off operation (time T21), the source of the power supply is switched from the AC power supply to the self-powered unit 38. The supply of power is also continued during the power supply continuing period P1 from time T21 to time T28 (described below). The self-powered unit 38 supplies the power stored until time T21 of the power-off operation to each unit of the MFP 10 in a period from time T21 of the power-off operation (to time T28) (also referred to as the "power supply continuing period"). The power supply continuing period is, for example, several to several tens of seconds.

At time T28 after a lapse of the power supply continuing period P1 (for example, a predetermined period of time) since time T21, the supply of power from the self-powered unit 38 is interrupted (voltage droops).

After a repower-on operation (the next power-on operation after the power-off operation) is performed by the main power switch 39 at time T31, the MFP 10 executes a development process of developing the snapshot data stored in the eMMC 33.

Specifically, the MFP 10 returns the data (the save target information) saved (stored) in advance in the eMMC 33 to the RAM 32 once. Moreover, the save target information related to each hardware processing unit (for example, each of the devices 20 and 21 to 25) is returned from the RAM 32 to its corresponding hardware component (for example, the register and memory in each of the devices 20 and 21 to 25). With such a development process, the main body unit (the device 20) of the MFP 10 and the other devices 21 to 25 of the MFP 10 return to the state at the time of the power-off operation.

With such a return operation using snapshot data, the MFP 10 can start up (make a transition from the power-off state Q0 to the ready state Q1) faster than when the snapshot data is not used (when the normal initialization process is performed after the power-on operation).

For example, in terms of the image processing ASIC 23, the initialization process includes performing a computation process of, for example, calculating values of multiple variables (parameters) indicating various states with the system controller 20 based on information specified by a user, and then performing a setting process of, for example, setting the values related to the computation process results to the variables, respectively. On the other hand, the development process from time T31 to time T33 does not include performing the initialization process. As a result, the computation process included in the initialization process is not performed, either. The development process from time T31 to time T33 includes storing (developing) the information acquired in the snapshot acquisition process (times T22 to T23) (the information stored (saved) in the eMMC 33) in the registers, memories, and the like in the RAM 32 and the image processing ASIC 23. Therefore, the image processing ASIC 23 can make a transition to a normal usable state (a state where normal use is possible) relatively faster than when the initialization process including the computation process is performed again from time T31 to time T33.

Similar effects can also be obtained for the other devices, for example, 21, 22, 24, and 25.

<Operation from the Sleep State (Power Saving State) Q2 (Operation According to a Comparative Example)>

Next, a description is given of the operation of when the power-off operation (the main power turn-off operation) is performed on the MFP 10 in the sleep state Q2, and the operation of when the power-on operation is subsequently performed.

Figure 6:
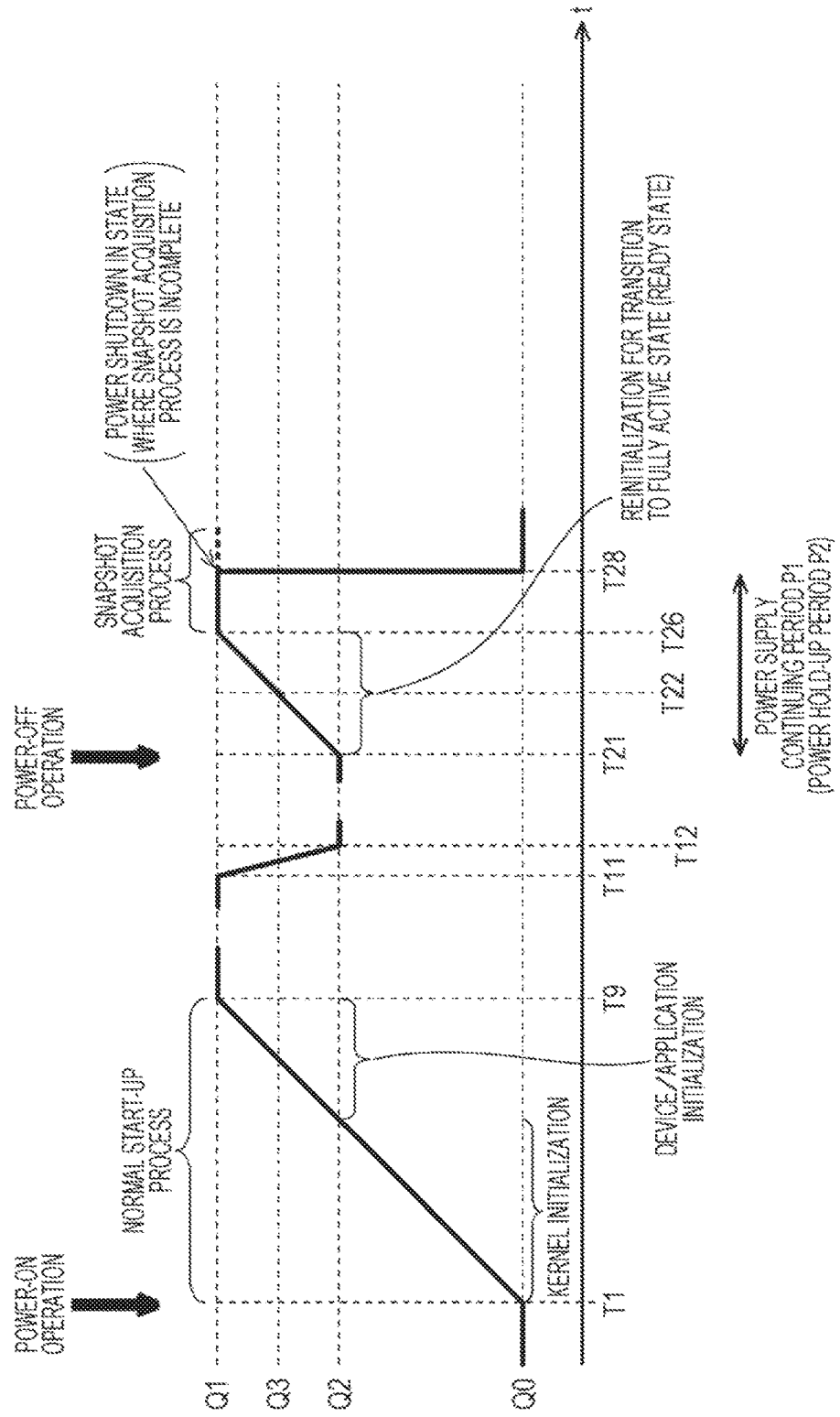
FIG. 6 is a conceptual diagram illustrating the operation and the like of when the power-off operation is performed in the sleep state according to a comparative example.

However, before the operation of FIG. 5 according to the embodiment is described, the operation of FIG. 6 according to a comparative example is described.

In FIG. 6, at time T1, the power-on operation is performed. When a certain period of non-operation continues after the MFP 10 makes a transition to the ready state Q1 at time T9, the MFP 10 makes a transition to the sleep state Q2. Specifically, a transition from the ready state Q1 to the sleep state Q2 starts at time T11. The transition to the sleep Q2 is completed at time T12.

When the power-off operation by the main power switch 39 is subsequently accepted in the sleep state Q2 (time T21), all devices that are in the halt state in the sleep state Q2 (for example, five devices 21 to 25) in the first device group are initialized (including restarting) (times T21 to T26). When the initialization is completed, the snapshot acquisition process is started. Specifically, the MFP 10 sequentially stores the save target information related to the first device group (including all the halting devices) as the snapshot data in the eMMC 33 (from time T26).

However, at time T28 after a lapse of the power supply continuing period P1 since time T21, the supply of power from the self-powered unit 38 is interrupted.

It takes a relatively long time to finish the initialization process on all the halting devices (for example, the devices 21 to 25) in the sleep state Q2 and the snapshot acquisition process on the first device group (for example, the devices 20 to 25). Hence, the initialization process on all the halting devices and the snapshot acquisition process on the first device group may not be able to be finished before time T28. In other words, the supply of power may be interrupted during the snapshot acquisition process.

When the repower-on operation (the next power-on operation after the power-off operation) is subsequently performed by the main power switch 39 at time T31 as in FIG. 4, the MFP 10 executes the development process of developing the snapshot data stored in the eMMC 33 in the MFP 10.

However, the snapshot acquisition process on the first device group (including all the halting devices 21 to 25 of return targets) is not complete; accordingly, the snapshot data acquired by the incomplete snapshot acquisition process is not normal data.

For example, if power is shut down after the end of the snapshot acquisition process on the device 21, the snapshot data is not successfully acquired by the snapshot acquisition process on the devices 22 to 25. Therefore, if this snapshot data by the snapshot acquisition process is used, the inconvenience caused by that the snapshot data is not normal (for example, the operation panel unit 22 does not make a transition to the normal display state) can occur. More specifically, if the snapshot data includes non-normal values of the state variables of the operation panel unit 22, for example, a circumstance can occur in which the normal initial screen is not displayed on the operation panel unit 22, and a screen other than the normal initial screen is displayed (or no screens are displayed).

In the embodiment, when the power-off operation (the main power turn-off operation) is performed on the MFP 10 in the sleep state Q2, the MFP 10 executes the snapshot acquisition process only on a second device group. The second device group is a device group excluding, from the first device group, remaining devices, exclusive of some (devices targeted for the initialization process) of two or more devices halting (not working) at the time of the power-off operation. For example, as described below, three devices 20, 23, and 24 are illustrated by example as the second device group in a device list L2 in FIG. 7. The three devices 20, 23, and 24 are a device group excluding, from the first device group 20 to 25, remaining devices 21, 22, and 25 exclusive of some (the devices 23 and 24 targeted for the initialization process) of the five devices 21 to 25 in the halt state.

In short, the MFP 10 does not target the whole first device group (including all of the two or more devices in the halt state) for the snapshot acquisition process, but targets only the second device group narrowed down from the first device group (a device group excluding the remaining devices from the first device group) for the snapshot acquisition process. More specifically, some devices (for example, two devices 23 and 24) are determined from two or more devices (for example, five devices 21 to 25) in the halt state such that the total time of the reinitialization process on the some of the two or more devices, and the snapshot acquisition process on the devices of the second device group (for example, three devices 20, 23, and 24) falls within the power supply continuing period P1.

<Operation from the Sleep State (Power Saving State) Q2 (Operation According to the First Embodiment)>

Next, a description is given of the operation of when the power-off operation (the main power turn-off operation) is performed on the MFP 10 in the sleep state Q2, and the operation of when the power-on operation is subsequently performed in the embodiment.

As illustrated in FIG. 5, when the power-on operation is performed at time T1 to perform the normal start-up process, the MFP 10 makes a transition to the ready state Q1 (time T9). Furthermore, when a certain period of no-operation continues, the MFP 10 starts a transition from the ready state Q1 to the sleep state Q2 at time T11. The transition to the sleep state Q2 is completed at time T12.

When the power-off operation by the main power switch 39 is subsequently accepted in the sleep state Q2 (time T21), the MFP 10 executes a second snapshot acquisition process and the like. Specifically, firstly, the MFP 10 initializes (including restarting) only some (for example, two devices 23 and 24) of two or more devices (for example, five devices 21 to 25) halting in the sleep state Q2 (times T21 to T22). When the initialization is completed, the MFP 10 stores save target information related to the some devices as the snapshot data in the eMMC 33 (times T22 to T24).

The initialization process (times T21 to T22) includes resuming the supply of power to the devices targeted for the initialization process to restart the target devices, and also performing the above-mentioned various computation processes for making a transition to a state where the target devices can be used, and a storage process of storing the process results of the computation processes in the registers, memories, and the like of the devices.

Moreover, the subsequent snapshot acquisition process includes executing the process of acquiring snapshot data related to devices targeted for the snapshot acquisition process.

More specifically, as illustrated in FIG. 8, data targeted for the snapshot acquisition process includes save target information related to the main body processing unit (the system controller 20) of the MFP 10, which is stored in the RAM 32. The save target information (values of the state variables indicating the apparatus state, various kinds of data to be used by the main body processing unit, and the like) related to the main body processing unit of the MFP 10 is transferred from the RAM 32 to the eMMC 33 and stored therein.

Moreover, in terms of the above-mentioned some (for example, the devices 23 and 24) of the plurality of hardware processing units (for example, the devices 21 to 25) halting at the time of the power-off operation, save target information (values of the state variables of the some devices, and the like) after the completion of the reinitialization process (times T21 to T22) is also included in the snapshot acquisition process targets. Specifically, the save target information of the some devices is copied (transferred and stored) once from the some devices to the RAM 32 after the completion of the reinitialization process on the some devices, and then further transferred to the eMMC 33 and stored therein (times T22 to T24).

In this manner, when the power-off operation is performed by the main power switch 39, the process of storing the save target information related to the MFP 10 in the nonvolatile storage unit (the eMMC 33) (the snapshot acquisition process) is performed. However, when the power-off operation is performed in the sleep state Q2, the devices targeted for the snapshot acquisition process are not the whole first device group but are narrowed down (restricted) to the second device group including a relatively small number of devices. Moreover, the devices targeted for the initialization process are narrowed down (restricted) only to some of two or more devices halting at the time of the power-off operation. Moreover, when the power-off operation is performed in the sleep state Q2, the initialization process on halting devices among devices included in the second device group is also performed.

At time T28 after a lapse of the power supply continuing period P1 since time T21, the supply of power from the self-powered unit 38 is interrupted (voltage droops). As described above, during the period from time T21 to time T28 (described below), the supply of power from the self-powered unit 38 continues.

When the repower-on operation (the next power-on operation after the power-off operation) is subsequently performed by the main power switch 39 at time T31, the MFP 10 executes the development process of developing, in the MFP 10, the snapshot data (the data acquired in the second snapshot acquisition process) stored in the eMMC 33 first.

Specifically, the MFP 10 returns the save target information saved (stored) in advance in the eMMC 33 once to the RAM 32. Moreover, pieces of the save target information related to the some hardware processing units (the devices 23 and 24) are returned from the RAM 32 to registers and (memories) in their corresponding devices 23 and 24. With such a development process, the device 20 (the main body processing unit) of the MFP 10 returns to the state at the time of the power-off operation, and also the devices 23 and 24 of the MFP 10 make a transition to the initial state.

With the development process from time T31 to time T32, the some devices (for example, the two devices 23 and 24) being the devices targeted for the second snapshot acquisition process return not to the state at the time of the power-off operation (the sleep state Q2) but to the normal state (the same state as one immediately after the initialization process after the previous ready state Q1). In other words, the MFP 10 makes a transition to an intermediate state Q3 between the ready state Q1 and the sleep state Q2. That is, relatively fast start-up to the state Q3 is achieved by means of the snapshot data.

Consequently, start-up can be achieved faster than when the initialization process is performed on the some devices after the power-on operation.

For example, in terms of the image processing ASIC 23, the initialization process from time T21 to time T22 includes performing a computation process of, for example, calculating values of multiple variables (parameters) indicating various states based on information specified by the user with the system controller 20, and also performing a setting process of, for example, setting the values related to the computation process results to the variables, respectively. On the other hand, the development process from time T31 to time T32 does not include performing the initialization process. As a result, the computation process included in the initialization process is not performed, either. The development process from time T31 to time T32 includes storing (developing) the information acquired in the snapshot acquisition process (times T22 to T24) (the information stored (saved) in the eMMC 33) in the registers, memories, and the like in the RAM 32 and the image processing ASIC 23. Therefore, the image processing ASIC 23 can makes a transition to a normal usable state (a state where normal use is possible) relatively faster than when the initialization process including the computation process is performed again from time T31 to time T32.

Moreover, in terms of the sound playback processing IC 24, the initialization process from time T21 to time T22 includes performing a computation process of, for example, generating sound data for playback with the system controller 20 based on information specified by the user such as the volume, quality, and the like of the sound data, and also performing a setting process of, for example, storing data (sound data) on the computation process results, and the like in a memory and the like in the sound playback processing IC 24. On the other hand, the development process from time T31 to time T32 does not include performing the initialization process. As a result, the computation process included in the initialization process is not performed, either. The development process from time T31 to time T32 includes storing (developing) the information acquired in the snapshot acquisition process (times T22 to T24) (the information stored (saved) in the eMMC 33) in the registers, memories, and the like in the RAM 32 and the sound playback processing IC 24. Therefore, the sound playback processing IC 24 can make a transition to the normal usable state relatively faster than when the initialization process including the computation process is performed again from times T31 to time T32.

In terms of the other devices, for example, 21, 22, and 25, similar effects can be obtained also if the initialization process (times T21 to T22) and the snapshot acquisition process (times T22 to T24) are performed, and then the development process (times T31 to T32) is performed.

For example, in terms of the operation panel unit 22, the initialization process includes performing a computation process of, for example, generating display image data with the system controller 20 based on, for example, the size (information on the number of pixels) of a display panel, and also performing a setting process of, for example, storing data related to the computation process results, and the like in a memory and the like in the operation panel unit 22.

Moreover, in terms of the authentication device 25, the initialization process includes performing a computation process of, for example, generating structure data in accordance with specifications of the authentication device (data on a data structure related to user data that specifies each user's authentication information and the like) (a computation process related to data generation) with the system controller 20, and also performing a setting process of, for example, storing data related to the computation process results, and the like in a memory and the like in the authentication device 25.

Moreover, in terms of the HDD 21, the initialization process includes performing various computation processes and a setting process of, for example, storing data related to the computation process results, and the like in a memory and the like in the HDD 21.

In terms of these devices, for example, 21, 22, and 25, if the initialization process and the snapshot acquisition process are performed first and then the development process is performed, the computation processes (the above-mentioned various computation processes in the initialization process) are not required in the snapshot data development process (times T31 to T32). Hence, the processing time can be reduced compared to when the initialization process with the computation processes is performed. Moreover, with the snapshot data development process, data related to the computation process results (the save target information) can be acquired fast. Therefore, the devices, for example, 21, 22, and 25 can also make a transition to the normal usable state relatively faster than when the initialization process with the computation processes is performed again from time T31 to time T32.

Furthermore, the MFP 10 executes the initialization process on the remaining devices (that is, the non-target devices in the second snapshot acquisition process) 21, 22, and 25, exclusive of the devices (20, 23, and 24) targeted for the second snapshot acquisition process, of all the devices (20 and 21 to 25) targeted for the first snapshot acquisition process. Consequently, the remaining devices (21, 22, and 25) also return to the normal state.

As described above, according to the embodiment, when the power-off operation is performed in the sleep state Q2 of the MFP 10 (time T21), the some (the devices 23 and 24) of the two or more devices 21 to 25 in the halt state are initialized (including restarting) first (times T21 to T22) Next, the process of storing the save target information related to the second device group including the some devices as the snapshot data in the eMMC 33 (the second snapshot acquisition process) is executed (times T22 to T24). At the time of the next power-on operation, the development process with the snapshot data is performed; accordingly, start-up can be achieved relatively fast (at least faster than the normal start-up).

Moreover, the devices targeted for the initialization process are narrowed down (restricted) only to, for example, the some (the devices 23 and 24) of the two or more devices 21 to 25 in the halt state; accordingly, the time required for the initialization process can be reduced. Moreover, the devices targeted for the snapshot acquisition process are narrowed down to the second device group (20, 23, and 24) from the first device group (20 and 21 to 25); accordingly, the time required for the snapshot acquisition process can be reduced, which in turn enables avoiding the end of power supply from the self-powered unit 38 during the initialization process or snapshot acquisition process. Therefore, adverse effects caused by the use of incomplete snapshot data upon the next power-on operation can be avoided. In other words, also if the snapshot acquisition process is performed from the sleep state Q2, adverse effects on the operation of the image forming apparatus after the next start-up can be avoided.

<Details of the Snapshot Acquisition Process and the Return Process>

Figure 9:
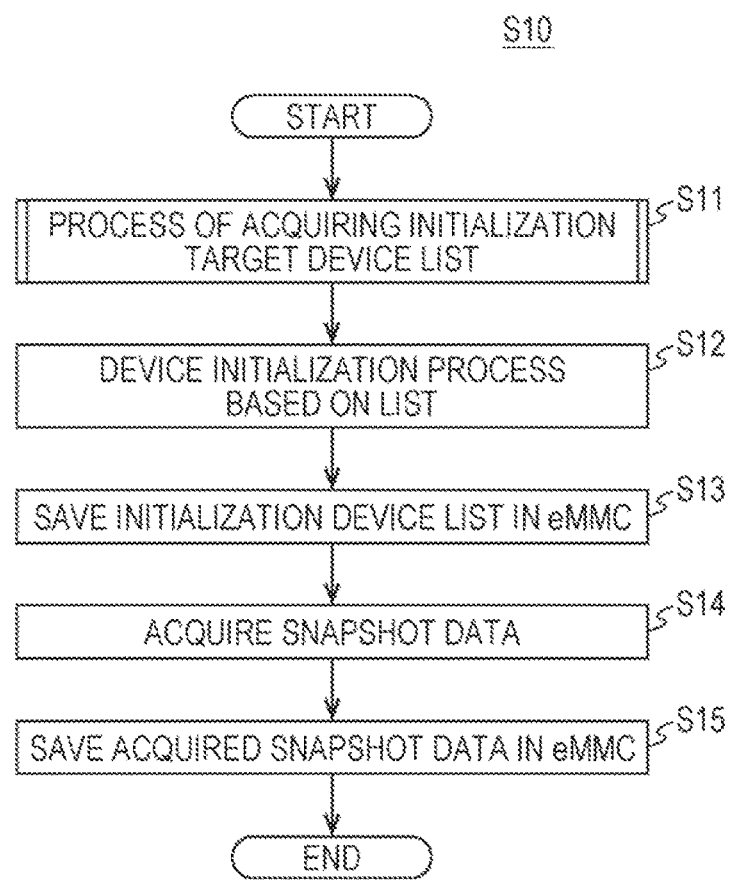
FIG. 9 is a flowchart illustrating the operation of when the power-off operation is performed.
Figure 10:
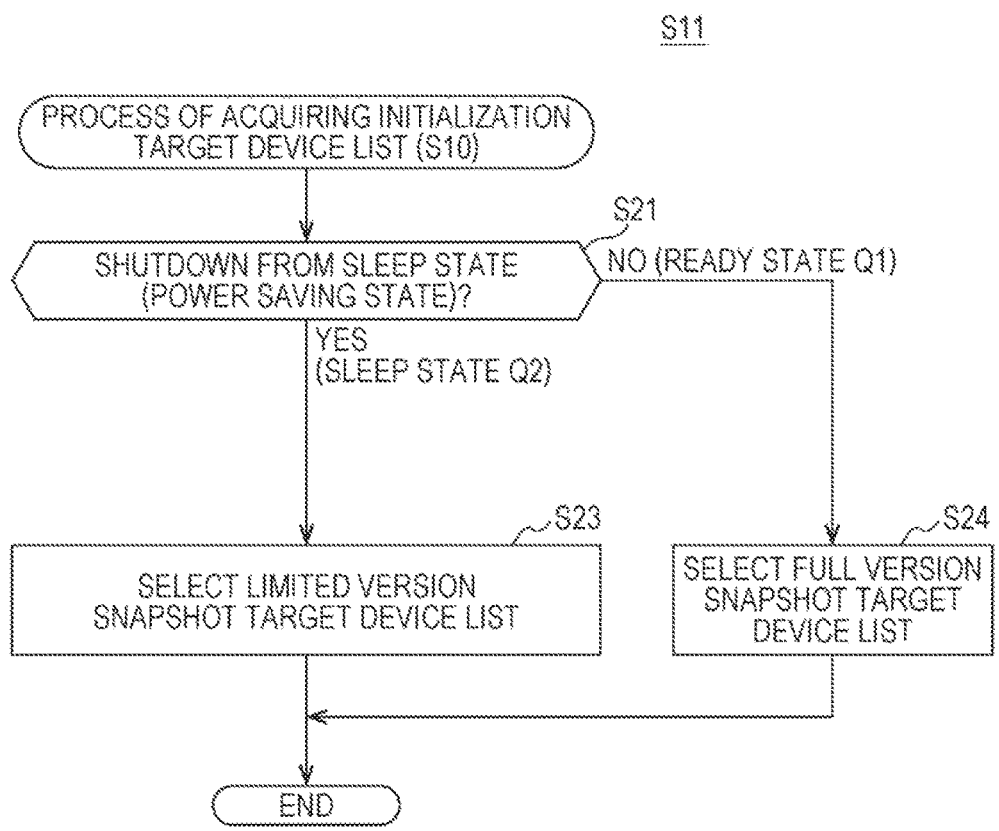
FIG. 10 is a flowchart illustrating the operation of when the power-off operation is performed.
Figure 11:
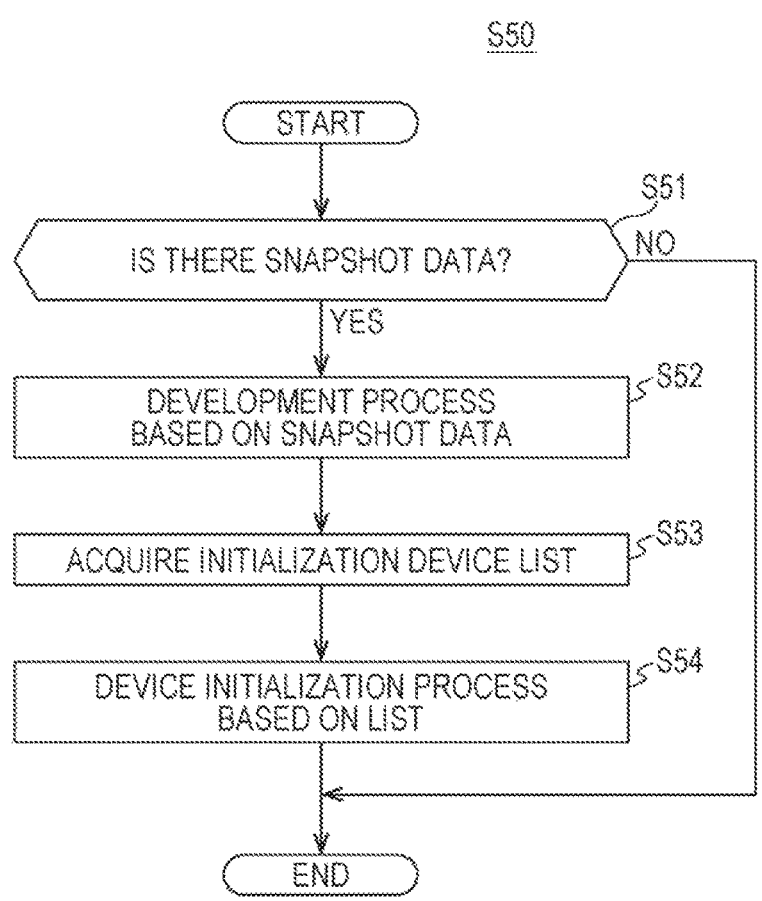
FIG. 11 is a flowchart illustrating the operation of when the next power-on operation is performed.

Next, the operation of the system controller 20 (specifically, a program to be executed by the system controller 20) of the MFP 10 according to the first embodiment is described in more detail with reference to, for example, FIGS. 9 to 11. FIGS. 9 and 10 are flowcharts illustrating the operation of when the power-off operation is performed by the main power switch 39. FIG. 11 is a flowchart illustrating the operation of when the next power-on operation (the power-on operation by the main power switch 39) is performed after the power-off operation.

When the power-off operation is performed by the main power switch 39, various job operations are stopped to switch the source of power supply to the self-powered unit 38. A preparation process (steps S11 to S13) for the snapshot acquisition process, the snapshot acquisition process (step S14), and the like are then performed.

Specifically, a process of acquiring an initialization target device list is executed first in step S11 in FIG. 9 (see also FIG. 10).

Specifically, in step S21 (FIG. 10), it is determined in which of the ready state Q1 and the sleep state Q2 the power-off operation was performed. In accordance with the determination result, one of two kinds of device lists (data tables) L1 and L2 prepared in advance in the MFP 10 is selected.

If it has been determined that the power-off operation was performed in the ready state Q1, the processing proceeds to step S24. In step S24, the MFP 10 acquires the device list L1 (see FIG. 7) for the first snapshot acquisition process. Six devices 20 and 21 to 25 are listed as the devices targeted for the snapshot acquisition process in the device list L1. The device list L1 is also referred to as the "full version device list L1" since all the devices 20 and 21 to 25 that can be the snapshot acquisition process targets are listed in the device list L1. Of them, five devices 21 to 25 are devices that are running in the ready state Q1 but are halting in the sleep state Q2.

On the other hand, if it has been determined that the power-off operation was performed in the sleep state Q2, the processing proceeds to step S23. In step S23, the MFP 10 acquires the device list L2 (see FIG. 7) for the second snapshot acquisition process. Devices narrowed down from all of the above devices 20 and 21 to 25 (here, three devices 20, 23, and 24) are listed as the devices targeted for the snapshot acquisition process in the device list L2. The device list L2 is also referred to as the "limited version device list L2" since only the limited devices 20, 23, and 24 of the six devices 20 and 21 to 25 are listed in the device list L2.

In the device list L2, the second device group is specified such that the following condition C1 is satisfied. The condition C1 is a condition that a total time Z does not exceed a period length M of a "power holdable period" (P2). The total time Z is the total time of the sum of times required for the initialization process on some (the devices 23 and 24 in FIG. 7) of two or more devices that are in the halt state in the sleep state Q2, and the sum of times required for the process of acquiring save target information (apparatus use information) related to devices (the devices 20, 23, and 24 in FIG. 7) belonging to the second device group (also referred to as the saving process or storage process). Moreover, the period length M of the "power holdable period" (the period during which the self-powered unit 38 can supply power (in a state where the supply of power from the AC power supply is lost)) P2 is assumed to be predetermined based on the storage capacity of the self-powered unit 38 (M=M0 (a predetermined value). In the embodiment, the power holdable period P2 is also used as the power supply continuing period P1.

In this manner, the condition C1 is a condition that the total time Z falls within the period length M of the power holdable period P2 (the period length of the power supply continuing period P1) (the total time Z is equal to or less than the period length M).

In the next step S12, the initialization process is executed based on an applicable device list (L1 or L2).

For example, if the device list L2 is acquired in step S11 (if the MFP 10 has made a transition to the sleep state Q2), the initialization process is performed based on the device list L2. Specifically, a process of starting devices specified in the device list L2 among the two or more devices that are in the halt state at that time and performing the initialization process thereon is performed. Specifically, of the five devices 21 to 25 halting in the sleep state Q2, only two devices 23 and 24 specified as the target devices in the device list L2 are started and initialized (times T21 to T22 (FIG. 5)).

Alternatively, if the device list L1 is acquired in step S11 (if the MFP 10 has made a transition to the ready state Q1), the initialization process is performed based on the device list L1. Specifically, a process of starting devices specified in the device list L1 among the devices that are in the halt state at that time and performing the initialization process thereon is performed. However, if the MFP 10 is in the ready state Q1, all the five devices 21 to 25 specified in the device list L1 are in the working state; accordingly, the initialization process is not executed on the five devices.

Next, the MFP 10 saves the device list (L1 or L2) acquired in step S11 in the eMMC 33 (step S13).

In step S14, the MFP 10 acquires snapshot data based on the acquired device list (L1 or L2).

For example, if the device list L1 is acquired in step S11, the snapshot acquisition process is executed on the six devices 20 and 21 to 25 described in the device list L1 (times T22 to T23 (FIG. 4)).

On the other hand, if the device list L2 is acquired (selected) in step S11, the snapshot acquisition process is executed on the three devices 20, 23, and 24 described in the device list L2 (times T22 to T24 (FIG. 5)).

In the next step S15, the snapshot data acquired in step S14 is saved in the eMMC 33.

The power supply unit 36 then interrupts the supply of power to each unit of the MFP 10 (time T28 (see FIGS. 4 and 5)).

As described above, the processing after the power-off operation is performed (times T21 to T28).

Next, some time after the above-mentioned power-off operation, the power-on operation is performed in turn (time T31).

FIG. 11 is a flowchart illustrating the processing immediately after the power-on operation (step S50).

Firstly, the system controller 20 (specifically, the program to be executed by the system controller 20) of the MFP 10 checks the presence or absence of snapshot data after the start of the supply of power from the power supply unit 36 (specifically, the AC-DC conversion unit 37 or the like) (step S51).

If there is no snapshot data, the normal start-up process is performed.

On the other hand, if there is snapshot data, the fast start-up process (steps S52 to S54) is performed.

For example, if there is data D2 acquired in the second snapshot acquisition process as the snapshot data, the development process of developing the snapshot data D2 is executed first (step S52). In the development process of the snapshot data D2, save target information related to three target devices 20, 23, and 24 in the second snapshot acquisition process is developed. Accordingly, the three devices 20, 23, and 24 return excellently to the state after the previous power-off operation and at the time of the completion of reinitialization (on the devices 23 and 24) (time T22 (FIG. 5)).

The MFP 10 then acquires the device list L2 stored in the eMMC 33 (step S53), identifies non-target devices for the previous snapshot acquisition process based on the device list L2, and executes the initialization process on the non-target devices (step S54). Specifically, the MFP 10 identifies three devices 21, 22, and 25 specified in the device list L2 to be the non-target devices as non-target devices for the snapshot acquisition process (remaining devices, exclusive of some devices (the devices 23 and 24) targeted for the initialization process, of five devices 21 to 25 in the halt state). Furthermore, the MFP 10 executes the initialization process on the remaining devices (non-target devices) 21, 22, and 25. In other words, the initialization process is executed on the non-target devices for the second snapshot acquisition process.

On the other hand, if there is data D1 acquired in the first snapshot acquisition process as the snapshot data, the process of developing the snapshot data D1 is executed first (step S52). In the development process of the snapshot data D1, save target information related to six devices 20 and 21 to 25 are developed (restored). Accordingly, all the six devices 20 and 21 to 25 are excellently returned to the state immediately before the previous power-off operation.

The MFP 10 then acquires the device list L1 stored in the eMMC 33 (step S53), and identifies non-target devices for the snapshot acquisition process based on the device list L1 (step S54). However, the device list L1 specifies that there are no non-target devices; accordingly, an additional device initialization process is not executed.

With such operation as described above, when the power-off operation is performed in the ready state Q1 of the MFP 10, the process of storing the save target information related to the plurality of devices (all the target devices) 20 and 21 to 25, and the like as the snapshot data in the eMMC 33 (the first snapshot data acquisition process) is executed (times T21 to T23 (FIG. 4)). Consequently, start-up can be achieved very fast at the time of the next power-on operation (times T31 to T33 (FIG. 4)). In this manner, when the power-off operation is performed in the ready state Q1, start-up can be achieved very fast at the time of the next power-on operation.

On the other hand, when the power-off operation is performed in the sleep state Q2 of the MFP 10, the device list L2 is used to determine the second device group such that the above-mentioned condition C1 is satisfied. The initialization process and the snapshot acquisition process are executed based on the second device group (times T21 to T24 (FIG. 5)).

Specifically, "some devices" (devices targeted for the initialization process) are determined from the two or more devices 21 to 25 in the halt state to perform the initialization process (including restarting) on the some devices 23 and 24. Furthermore, the process of storing save target information related to the second device group (the devices 20, 23, and 24) including the some devices as the snapshot data in the eMMC 33 (the second snapshot acquisition process) is executed. Consequently, start-up can be achieved relatively fast (at least faster than the normal start-up) at the time of the next power-on operation (times T31 to T34 (FIG. 5)). Moreover, the devices targeted for the snapshot acquisition process are narrowed down only to the second device group (the three devices 20, 23, and 24 of the six devices 20 and 21 to 25) that includes a fewer devices than the first device group; accordingly, it is possible to avoid the end of the power supply from the self-powered unit 38 before the completion of the snapshot acquisition process.

In this manner, when the power-off operation is performed in the sleep state Q2, some of two or more devices halting at the time of the power-off operation are initialized and then the second snapshot acquisition process of storing save target information related to the second device group as the snapshot data in the storage device is executed. The second device group is a device group narrowed down from the first device group, the device group including the some devices. Therefore, also when the snapshot acquisition process is performed from the sleep state (power saving state) Q2, appropriate snapshot data can be acquired in a relatively short time. Accordingly, adverse effects on the operation of the MFP 10 after the next start-up can be avoided.

Moreover, in the power supply continuing period P1 after the time of the power-off operation, power is supplied using the self-powered unit 38 (a storage battery or the like). Consequently, it is possible to avoid the inconvenience occurring when the AC power supply continues supplying power in the power supply continuing period P1 (specifically, unexpected power shutdown due to, for example, the user removing an AC plug (a plug-in) from an AC receptacle (outlet (socket)) immediately after the power-off operation), and execute the snapshot acquisition process more securely.

In the above embodiment, as illustrated in FIG. 4, a description is given assuming that the initialization is not performed when the power-off operation is performed in the ready state Q1. However, the present invention is not limited to this. For example, when the power-off operation (time T21) is performed in the ready state Q1, part of the initialization process may be performed immediately afterward. For example, the initialization process may be performed to return various settings to default settings (original initial settings immediately after start-up). More specifically, a process of returning various settings of a setting screen of the operation panel unit 22 (for example, a process of returning the duplex copy setting to the basic setting (simplex copy setting)) and the like may be performed as the initialization process. The snapshot acquisition process is simply required to be performed after the end of the partial initialization process. However, the partial initialization process ends in a relatively shorter time than the initialization process that is performed when the power-off operation is performed in the sleep state Q2 (times T21 to T22 in FIG. 5); accordingly, its influence is relatively small. Moreover, the power supply continuing period P1 may be determined in such a manner as to be equal to or more than the total time of the time required for the partial initialization process and the time required for the subsequent snapshot acquisition process.

<2. Second Embodiment>
<2-1. Overview>

Figure 7:
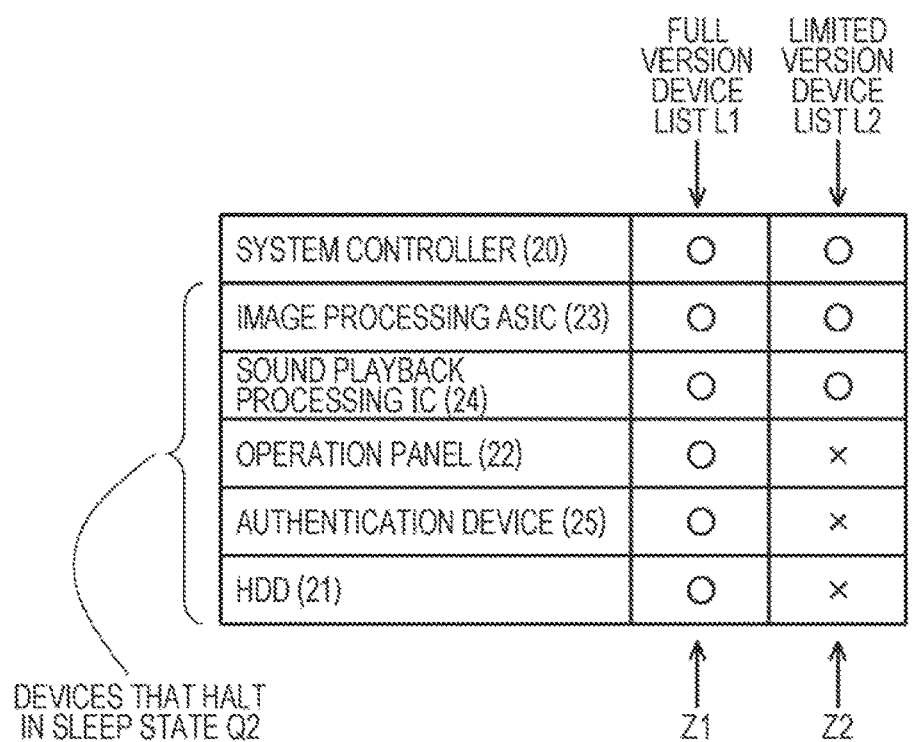
FIG. 7 is a diagram illustrating two kinds of device lists.

In the above embodiment, the devices targeted for the second snapshot acquisition process and the like are fixed to specific devices (for example, 20, 23, and 24) (see the device list L2 in FIG. 7). However, the present invention is not limited to this.

For example, the target devices may be changed (gradually narrowed down) considering the aged deterioration of the storage capacity of the self-powered unit 38, and the like.

Figure 12:
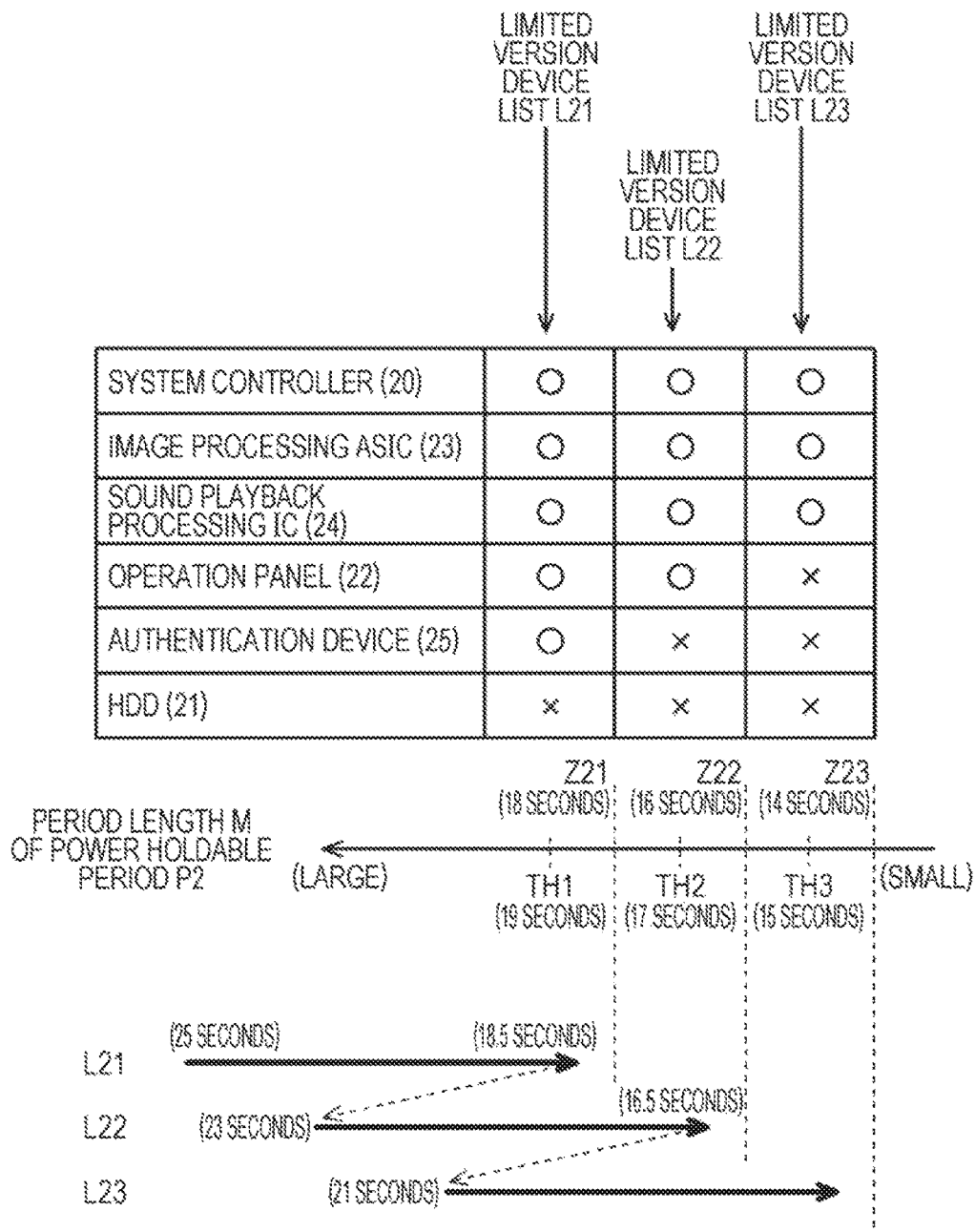
FIG. 12 is a diagram illustrating device lists and the like according to a second embodiment.
Figure 13:
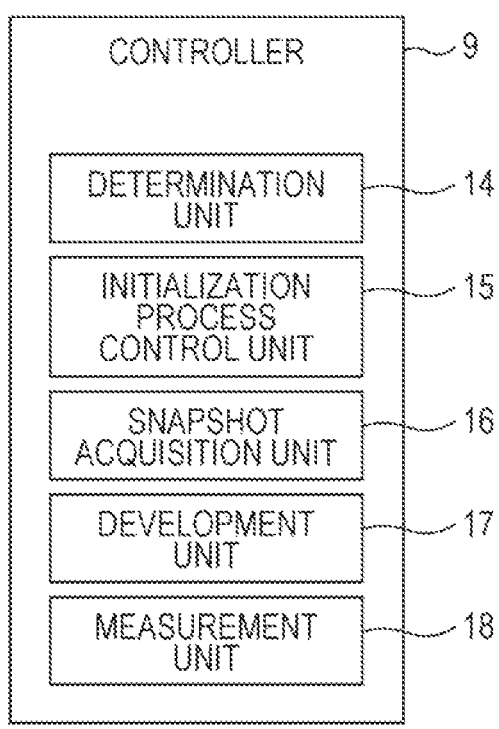
FIG. 13 is a diagram illustrating processing units caused by a controller to function according to the second embodiment.

FIG. 12 is a diagram illustrating device lists L2 (specifically, three device lists L21, L22, and L23) according to a second embodiment. A measurement unit 18 (see FIG. 13) of the MFP 10 measures the current storage capacity of the self-powered unit 38 based on an appropriate method, and converts the storage capacity to the period length M of the "power holdable period" (the period during which the self-powered unit 38 can supply power) P2. In other words, the measurement unit 18 estimates the period length M of the power holdable period P2. The period length of the power supply continuing period P1 is determined based on the period length M of the power holdable period P2. For example, the period length of the power supply continuing period P1 is determined to be the same value as the period length M of the power holdable period P2. The period length of the power supply continuing period P1 is not limited to the above and may be calculated as a value larger than the period length M (M+α (a margin value)), a value less than the period length M (M−α (the margin value)), or the like.

In accordance with the period length M of the power holdable period P2, one of the three lists L21, L22, and L23 illustrated in FIG. 12 is determined to be the device list L2. Each of the device lists L21, L22, and L23 is also expressed as a combination related to a device group targeted for the second snapshot acquisition process. Moreover, total times Z2 (Z21, Z22, and Z23) are specified associated respectively with the combinations (the device lists L21, L22, and L23). Each of the values Z21, Z22, and Z23 is a predetermined value (fixed value).

In the device list L21, five devices 20 and 22 to 25, exclusive of the device 21, of six devices 20 and 21 to 25 are listed as the devices targeted for the snapshot acquisition process. The total time Z2 of the sum of times required for the initialization process on four devices 22 to 25, which halt in the sleep state Q2, of the five devices, and the sum of times required for the snapshot acquisition process on the five devices 20 and 22 to 25 is the value Z21.

In the device list L22, only four devices 20 and 22 to 24 of the six devices 20 and 21 to 25 are listed as the devices targeted for the snapshot acquisition process. The total time Z2 of the sum of times required for the initialization process on three devices 22 to 24, which halt in the sleep state Q2, of the four devices, and the sum of times required for the snapshot acquisition process on the four devices 20 and 22 to 24 is the value Z22.

In the device list L23, only three devices 20, 23, and 24 of the six devices 20 and 21 to 25 are listed as the devices targeted for the snapshot acquisition process. The total time Z2 of the sum of times required for the initialization process on two devices 23 and 24, which halt in the sleep state Q2, of the three devices, and the sum of times required for the snapshot acquisition process on the three devices 20, 23, and 24 is the value Z23.

The total times Z21, Z22, and Z23 of the three device lists L21, L22, and L23 are gradually reduced in this order. In other words, a magnitude relation of Z21>Z22>Z23 exists between the three values Z21, Z22, and Z23 (the value Z21 is the largest and the value Z23 is the smallest).

In this manner, the device lists L21, L22, and L23 of three levels where the total required times Z are different from each other are created in advance and stored in advance in the eMMC 33.

Moreover, the device lists L21, L22, and L23 of the plurality of (three, here) levels are ranked (priorities are set) in advance in this order. Specifically, the device list L21 is ranked the highest, the device list L22 is ranked second, and the device list L23 is ranked the lowest. Moreover, a relatively smaller number of devices (that are narrowed down) are specified as the target device group as the device lists L21, L22, and L23 are ranked a relatively lower place (set a lower priority) (as the ranking decreases).

A list that is fit to be adopted as the device list L2 is determined from the three device lists L21, L22, and L23.

Firstly, it is determined whether or not the device list L21 is adopted as the device list L2 based on a magnitude relation between the period length M of the power holdable period P2 corresponding to the device list L21 (possessing the highest priority) and a threshold TH1. The period length M of the power holdable period P2 corresponding to the device list L21 is the length of a period during which the self-powered unit 38 can continue supplying power (in a state where the supply of power from the AC power supply is lost) while the snapshot acquisition process on the plurality of devices 20 and 22 to 25 included in the device list L21 and the initialization process on the plurality of devices (however, exclusive of the device 20) are executed. Also in terms of the other device lists, for example, L22 and L23, the period length M of the power holdable period P2 corresponding to each device list is assumed to be calculated. Moreover, the threshold TH1 is a value obtained by adding a predetermined margin (margin value) $\Delta t$ to the value Z21 (here, TH1=Z21+$\Delta t$). A case where Z21=18 seconds, Z22=16 seconds, Z23=14 seconds, and $\Delta t$=1 second is described below.

Specifically, when the self-powered unit 38 is still having a sufficient storage capacity, and the period length M of the power holdable period P2 is larger than the threshold TH1 (for example, in the early stage of use of the MFP 10), the device list L21 is determined to be the device list L2. For example, if the period length M of the power holdable period P2 corresponding to the device list L21 is determined to be 25 seconds (M=25 seconds), the period length M is larger than the threshold TH1 (19 seconds). Accordingly, the device list L21 is determined to be the device list L2. The snapshot acquisition process and the like are executed on the target devices included in the determined device list L21. Furthermore, the above-mentioned processing of step S50 is executed upon the next power-on operation.

The period length M of the power holdable period P2 then gradually decreases with the aged deterioration of the self-powered unit 38. At some point in time, the period length M of the power holdable period P2 decreases to a value smaller than the threshold TH1 (for example, "18.5 seconds"). At this point in time, a difference (0.5 seconds) between the period length M (18.5 seconds) and the value Z21 (18 seconds) is smaller than the margin value $\Delta t$ (one second); accordingly, the MFP 10 judges that it is not preferable to keep the device list L21 as the device list L2 (it may be difficult to execute the snapshot acquisition process based on the device list L21 (when considering an error and the like)). The MFP 10 determines that the device list L22 of the next level, instead of the device list L21, is a new device list L2.

The device list L22 of the next level includes a relatively smaller number of devices than the previous device list L21. Accordingly, the amount of power consumed (the amount of power consumed in the initialization process and the second snapshot acquisition process) is reduced according to the reduction in the number of devices. Consequently, the period length M of the power holdable period P2 corresponding to the device list L22 increases temporarily. The period length M increases to, for example, approximately 23 seconds. Consequently, the period length M of the power holdable period P2 has a relatively large difference (margin) from the value Z22 (16 seconds). Accordingly, it is possible to ensure the end of the snapshot acquisition process. The power holdable period P2 corresponding to the device list L22 is a period during which the self-powered unit 38 can continue supplying power after the initialization process on the three devices 22 to 24 included in the device list L22 and the saving process on the four devices 20 and 22 to 24 included in the device list L22 are executed.

It is then determined whether or not the device list L22 is kept as the device list L2 based on a magnitude relation between the period length M of the power holdable period P2 and a threshold TH2. The threshold TH2 is a value obtained by adding the predetermined margin (margin value) $\Delta t$ to the value Z22 (here, TH2=Z22+$\Delta t$=17 seconds).

Specifically, when the period length M of the power holdable period P2 is larger than the threshold TH2 (17 seconds), the device list L22 is determined to be the device list L2. For example, when the period length M is, for example, 23 seconds (or 18 seconds), the period length M is larger than the threshold TH2 (17 seconds). Accordingly, the device list L22 is determined to be the device list L2. The snapshot acquisition process and the like are executed on the target devices included in the determined device list L22. Furthermore, the above-mentioned processing of step S50 is executed upon the next power-on operation.

The period length M of the power holdable period P2 then gradually decreases with the further aging of the self-powered unit 38. At some point in time, the period length M of the power holdable period P2 decreases to a value (for example, "16.5 seconds") smaller than the threshold TH2 (17 seconds). At this point in time, a difference (0.5 seconds) between the period length M (16.5 seconds) and the value Z22 (16 seconds) is smaller than the margin value $\Delta t$ (one second); accordingly, the MFP 10 judges that it is not preferable to keep the device list L22 as the device list L2. The MFP 10 determines that the device list L23 of the next level, instead of the device list L22, is a new device list L2.

The device list L23 of the next level includes a relatively smaller number of devices than the previous device list L22. Accordingly, the amount of power consumed (the amount of power consumed in the initialization process and the second snapshot acquisition process) is reduced according to the reduction in the number of devices. Consequently, the period length M of the power holdable period P2 corresponding to the device list L23 increases temporarily. The period length M increases to, for example, approximately 21 seconds. Consequently, the period length M of the power holdable period P2 (the period during which the self-powered unit 38 can continue supplying power after the initialization process on the two devices 23 and 24 included in the device list L23 and the saving process on the three devices 20, 23, and 24 included in the device list L23 are executed) has a relatively large difference (margin) from the value Z23 (14 seconds). Accordingly, it is possible to ensure the end of the snapshot acquisition process.

It is then determined whether or not the device list L23 is kept as the device list L2 based on a magnitude relation between the period length M of the power holdable period P2 and a threshold TH3. Moreover, the threshold TH3 is a value obtained by adding the predetermined margin (margin value) $\Delta t$ to the value Z23 (here, TH3=Z23+$\Delta t$=15 seconds).

Specifically, when the period length M of the power holdable period P2 is larger than the threshold TH3 (15 seconds), the device list L23 is determined to be the device list L2. When the period length M is, for example, 21 seconds (or 16 seconds), the period length M is larger than the threshold TH3 (15 seconds). Accordingly, the device list L23 is determined to be the device list L2. The snapshot acquisition process and the like are executed on the target devices included in the determined device list L23. Furthermore, the above-mentioned processing of step S50 is executed upon the next power-on operation.

The period length M of the power holdable period P2 then gradually decreases with the further aging of the self-powered unit 38. At some point in time, the period length M of the power holdable period P2 decreases to a value smaller than the threshold TH3 (for example, "14.5 seconds"). At this point in time, a difference (0.5 seconds) between the period length M (14.5 seconds) and the value Z23 (14 seconds) is smaller than the margin value Δt (one second); accordingly, the MFP 10 judges that it is not preferable to keep the device list L23 as the device list L2. In this case, the MFP 10 exceptionally determines not to perform the second snapshot acquisition process. Not limited to the above operation, the MFP 10 may determine a device list L24 (not illustrated) of the further next level, instead of the device list L23, is a new device list L2.

The three thresholds TH1, TH2, and TH3 have the following magnitude relation, that is, TH1>TH2>TH3. Moreover, in terms of the selection of the device list L21 or L22, when M=TH1 holds true (when equality is attained), the device list L21 or L22 may be determined to be the device list L2. Similarly, in terms of the selection of the device list L22 or L23, when M=TH2 holds true, the device list L22 or L23 may be determined to be the device list L2.

In this manner, one device list is selected from the three device lists L21, L22, and L23. Specifically, one device list is selected which specifies a device group (a combination of devices) where the corresponding total time Z (Z2) falls within the period length M of the corresponding power holdable period P2 (the total time Z2 is equal to or less than the period length M) (and which includes a relatively large number of devices). In other words, a combination (a combination of devices) where its total time Z2 does not exceed the period length M of its power holdable period P2 is selected from the three kinds of combinations.

A device group included in the selected device list is determined to be the devices targeted for the second snapshot acquisition process. For example, if the device list L22 is selected, the four devices 20, 22, 23, and 24 included in the device list L22 are determined to be the devices targeted for the second snapshot acquisition process (the second device group). Moreover, the snapshot acquisition process and the like are executed on the target devices included in the determined device list L2. Furthermore, the above-mentioned processing of step S50 is executed upon the next power-on operation.

In other words, when the power-off operation is performed in the sleep state Q2, devices targeted for the initialization process (reinitialization process) and devices targeted for the snapshot acquisition process are determined such that the following condition C2 is satisfied. The condition C2 is a condition that the total time Z of the sum of times required for the initialization process on the devices targeted for the initialization process (reinitialization process), and the sum of times required for the process of acquiring save target information on the devices targeted for the snapshot acquisition process falls within the period length M of the power holdable period P2 (by extension, the power supply continuing period P1).

More specifically, a target device group specified in a high-ranking device list (for example, L21) being a device list with a relatively high ranking (a higher priority) among the device lists L21, L22, and L23 of the plurality of levels is provisionally determined to be a candidate device group.

If it has been determined that the period length M of the power holdable period P2 is larger than the total time Z of the sum of the times required for the initialization process on halting devices in the candidate device group and the sum of the times required for the process of acquiring the save target information of the candidate device group, and the difference between the period length M of the power holdable period P2 and the total time Z is larger than the predetermined level (Δt), the target device group specified in the high-ranking device list (for example, L21) is determined to be the device group targeted for the second snapshot acquisition process (the second device group). Moreover, the halting devices in the target device group specified in the high-ranking device list are determined to be the devices targeted for the initialization process.

On the other hand, if it has been determined that the difference between the period length M of the power holdable period P2 and the total time Z is smaller than the predetermined level (Δt) (including a case where the period length M is smaller than the total time Z), a target device group specified in a "lower-ranking device list" is determined to be the device group targeted for the second snapshot acquisition process (the second device group). Moreover, halting devices in the target device group specified in the "lower-ranking device list" are determined to be the devices targeted for the initialization process. The "lower-ranking device list" is a device list (for example, L22) ranked lower (more specifically, ranked second) than the high-ranking device list among the device lists of the plurality of levels.

When the device lists L2 (L21, L22, and L23) of the plurality of levels are created, devices required to be included in each of the device lists L21, L22, and L23 among a plurality of devices halting in the sleep state Q2 are preferably determined based on the following viewpoints and the like. In other words, devices required to be preferentially excluded from the device list L2 are preferably determined based on the following viewpoints and the like.

(1) Devices (HDD and the like) consuming a relatively large amount of power are preferentially excluded from the device list L2. For example, the power consumed by the HDD 21 is larger than the power consumed by each of the other devices 22 to 25. Accordingly, the HDD 21 is preferentially excluded from the device list L2. In FIG. 12, the HDD 21 is already excluded from the first-level device list L21, and also excluded from the second-level device list L22 and the third-level device list L23. Moreover, the power consumed by the operation panel unit 22 is larger than the power consumed by each of the other devices 23 to 25. Accordingly, the operation panel unit 22 is preferentially excluded (second) from the device list L2. In FIG. 12, the operation panel unit 22 is excluded from the device lists L22 and L23 of the second level and lower. In order to suppress influence due to variations in power consumption, it is preferable to compare the power consumed by each device with the maximum power consumed by the device in the initialization process and the snapshot acquisition process.

(2) Devices that may be removed when the next power-on operation is performed (for example, a USB connection authentication device, a USB keyboard, and a USB memory) are preferentially excluded from the device list L2. If a device included in the device list L2 is removed when the next power-on operation is performed, the normal start-up that does not use snapshot data is performed upon the next power-on operation to avoid an error caused by the disagreement of the device connection state, which results in a longer start-up time. Considering such a circumstance, it is preferable that devices that may be removed when the next power-on operation is performed be not forced to be included in the device list L2, or conversely be preferentially excluded from the device list L2. In FIG. 12, the (USB connection) authentication device is excluded from the second-level device list L22 and the third-level device list L23.

<2-2. Details of Operation>

Figure 14:
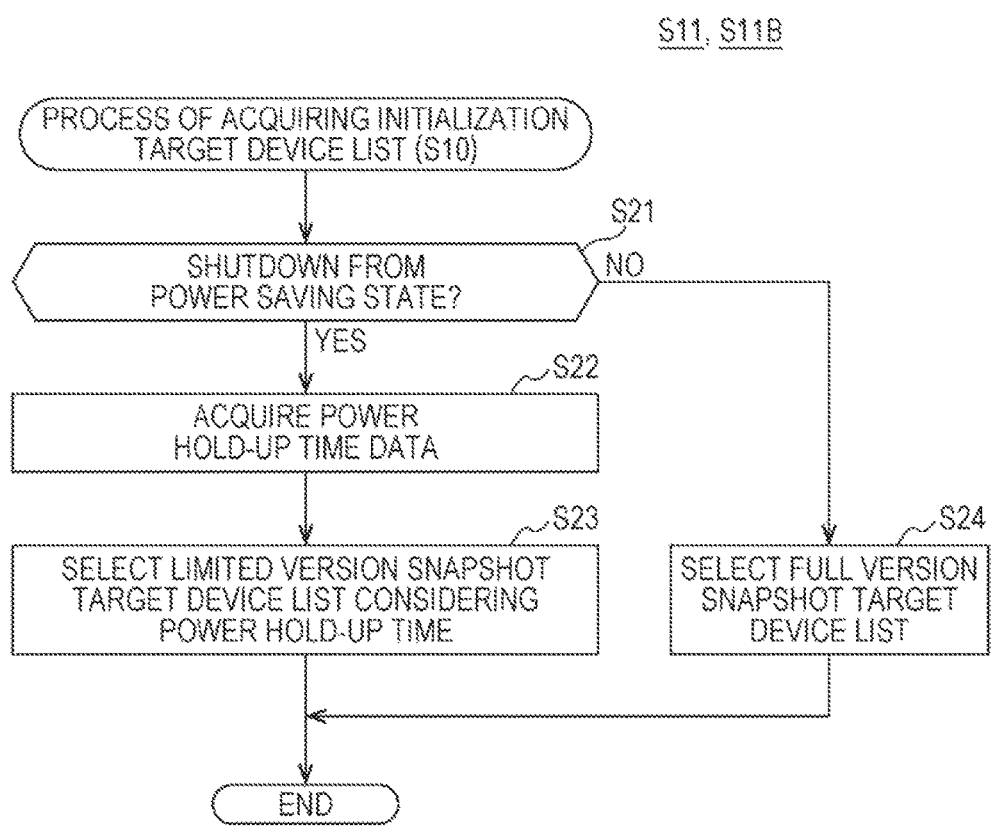
FIG. 14 is a flowchart illustrating (part of) operation according to the second embodiment.

Next, operation according to the second embodiment is described in detail with reference to FIG. 14. FIG. 14 is a flowchart illustrating the operation of step S11 (also referred to as S11B) according to the second embodiment. The second embodiment is different from the first embodiment in the way that the operation of FIG. 14 instead of FIG. 10 is performed. Focusing on the different points from the first embodiment, a description is given below.

In step S11B, as illustrated in FIG. 14, if it is determined in step S21 that the power-off operation was performed in the sleep state Q2, execution proceeds to step S22. In step S22, measurement data (an estimated value) of the power holdable period P2 (specifically, its period length M) is acquired. It is simply required to use, for example, a value estimated (measured) based on the voltage across the self-powered unit 38, and the like in the present power-on period as the measurement data of the power holdable period P2.

In step S23, as described above, in accordance with, for example, the period length M of the power holdable period P2, one of the three lists L21, L22, and L23 illustrated in FIG. 12 is determined to be the device list L2.

The initialization process and the like (steps S12 and S13 (see FIG. 9)) on the determined target devices, and the snapshot acquisition process and the like (steps S14 and S15) on the target devices are executed.

Moreover, when the next power-on operation has been performed, such operation as illustrated in FIG. 11 (step S50) is executed.

As described above, when the power-off operation is performed in a state where the self-powered unit 38 has a sufficient storage capacity (for example, in the early stage of use of the MFP 10), the device list L21 including the largest number of (here, five) target devices is selected from the three device lists L21, L22, and L23 in step S23 (FIG. 14). Specifically, a difference value (M−Z) between the period length M (M21) of the power holdable period P2 corresponding to the device list L21 and the total time Z corresponding to the device list L21 is determined to be larger than the predetermined value (Δt); accordingly, it is determined that the second snapshot acquisition process and the like (including the initialization process) with the device list L21 is required to be executed.

When the power-off operation is performed afterward in a state where the storage capacity of the self-powered unit 38 is deteriorated to some extent, the difference value (M−Z) between the period length M of the power holdable period P2 corresponding to the device list L21 and the total time Z corresponding to the device list L21 is determined to be smaller than the predetermined value (Δt) in step S23 (FIG. 14). In this case, instead of the device list L21, the device list L22 is determined to be the device list L2 that is fit to be adopted. In other words, it is determined that the initialization process and the second snapshot acquisition process are required to be executed with the device list L22 including a relatively small number of (here, four) target devices. In short, it is determined that the device list L22 narrowed down from the device list L21 is required to be used.

When the next and later power-off operations are performed further afterward, the difference value (M−Z) between the period length M of the power holdable period P2 corresponding to the device list L22 and the total time Z corresponding to the device list L22 is determined whether or not to be larger than the predetermined value (Δt) to execute processing based on the determination result in step S23 (FIG. 14).

If the difference value (M−Z) is determined to be larger than the predetermined value (Δt), it is determined that the second snapshot acquisition process and the like are required to be executed with the device list L22.

On the other hand, when the power-off operation is performed in a state where the storage capacity of the self-powered unit 38 is deteriorated to a further extent, the difference value (M−Z) is determined to be smaller than the predetermined value (Δt). In this case, it is determined that the second snapshot acquisition process and the like with the device list L23, instead of the second snapshot acquisition process and the like with the device list L22, are required to be executed in turn. In other words, it is determined that the second snapshot acquisition process and the like with the device list L23 including a relatively small number of (here, three) devices are required to be executed. In short, it is determined to use the device list L23 that has been narrowed down further.

With such operation, similar effects to those of the first embodiment can be obtained. Furthermore, in the above operation, one appropriate device list (one of L21, L22, and L23) in accordance with the power holdable period P2 is selected from the plurality of device lists L2. Devices included in the one device list are determined to be the devices targeted for the second snapshot acquisition process (steps S22 and S23). Therefore, the devices targeted for the second snapshot acquisition process are appropriately determined considering changes in the power holdable period P2 due to aged deterioration. More specifically, when the storage capacity of the self-powered unit 38 is still relatively high, the device list L21 specifying a relatively large number of devices as the target devices is selected. With the use of snapshot data related to the relatively large number of devices, the MFP 10 can start up relatively fast. On the other hand, when the storage capacity of the self-powered unit 38 starts deteriorating, the device list L22 (or L23) specifying a relatively small number of devices as the target devices is selected. Consequently, it is possible to reduce the number of the target devices and ensure the acquisition of snapshot data.

<3.>

A third embodiment is a modification of the second embodiment. Focusing on the different points from the second embodiment, a description is given below.

In the second embodiment, the total time Z corresponding to each of the device lists L21, L22, and L23 is predetermined. However, the present invention is not limited to this. For example, the total times Z2 (Z21, Z22, and Z23) corresponding respectively to the device lists L21, L22, and L23) may be calculated based on actual measurement values.

More specifically, the sum of times required for the initialization process on devices targeted for the initialization process is calculated based on actual times required for the initialization process on the devices targeted for the initialization process (initialization required times) (measurement values). Moreover, the sum of times required for the snapshot acquisition process on devices targeted for the snapshot acquisition process is calculated based on actual times required for the snapshot acquisition process on the devices targeted for the snapshot acquisition process (acquisition required times) (measurement values). The total time Z (Z2) is simply required to be calculated based on the sum of the initialization required times and the sum of the acquisition required times.

For example, the total time Z21 is simply required to be calculated based on the sum of times required for the initialization process on four devices 22 to 25 halting in the sleep state Q2, and the sum of times required for the snapshot acquisition process on five devices 20 and 22 to 25 also inclusive of the device 20 that is in a non-halt state. Moreover, the total time Z22 is simply required to be calculated based on the sum of times (actual measurement values) required for the initialization process on three devices 22 to 24 halting in the sleep state Q2, and the sum of times (actual measurement values) required for the snapshot acquisition process on four devices 20 and 22 to 24 also inclusive of the device 20 that is in the non-halt state. Similarly, the total time Z23 is simply required to be calculated based on the sum of times (actual measurement values) required for the initialization process on two devices 23 and 24 halting in the sleep state Q2, and the sum of times (actual measurement values) required for the snapshot acquisition process on three devices 20, 23, and 24 also inclusive of the device 20 that is in the non-halt state.

Figure 15:
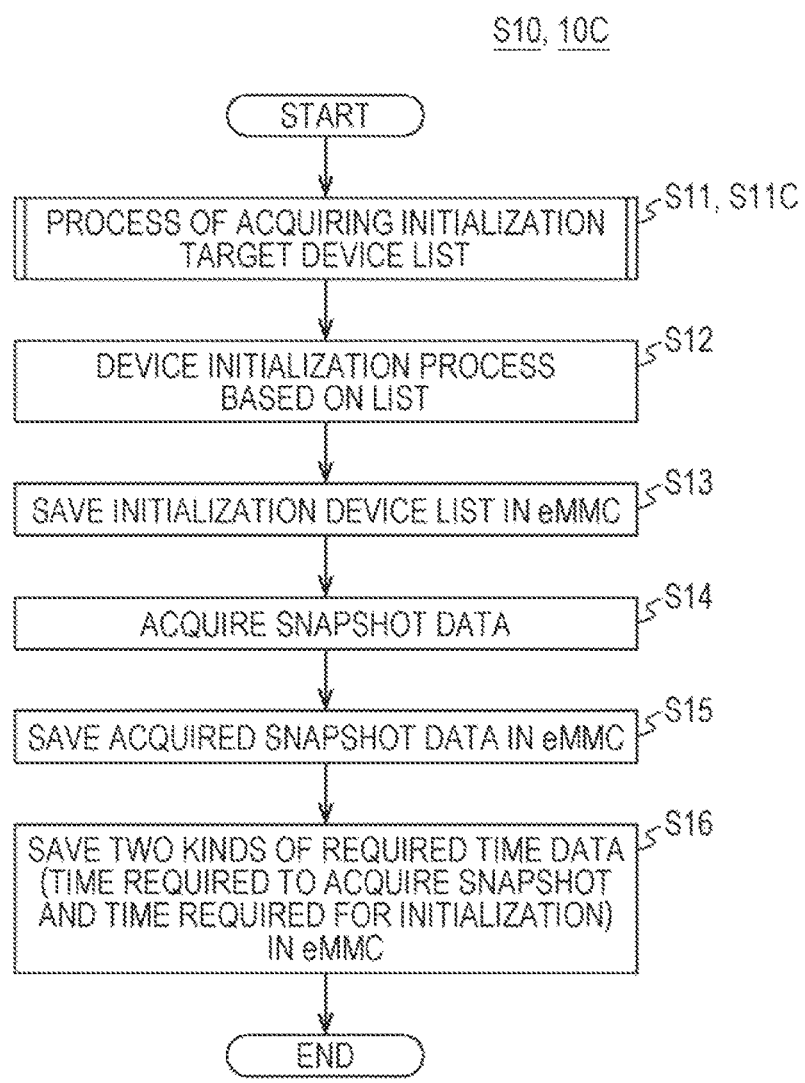
FIG. 15 is a flowchart illustrating operation according to a third embodiment.
Figure 16:
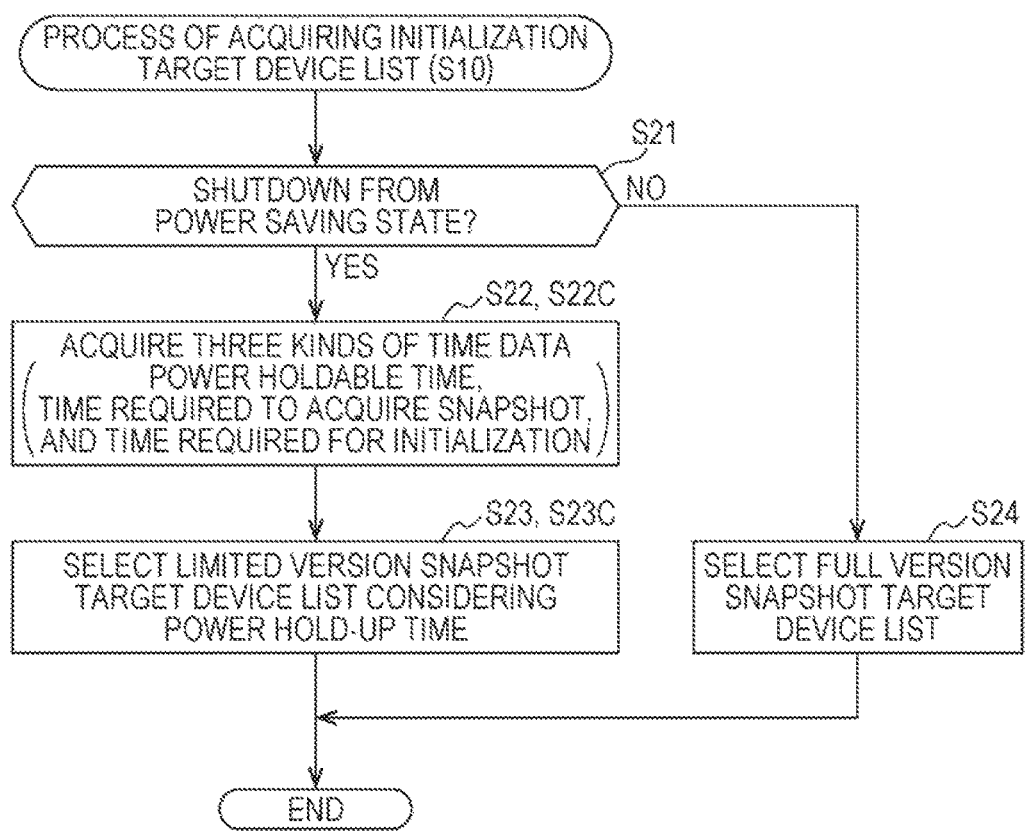
FIG. 16 is a flowchart illustrating part of the operation according to the third embodiment.

FIG. 15 is a flowchart illustrating operation according to a third embodiment. FIG. 16 is a flowchart illustrating the operation of step S11 according to the third embodiment. The third embodiment is different from the second embodiment in the way that the operation of FIG. 15 instead of FIG. 9 is performed, and the operation of FIG. 16 instead of FIG. 14 is performed (see, especially, steps S22, S23, and S16). The operation according to the third embodiment is described in detail below with reference to, for example, FIGS. 15 and 16.

In step S11 (S11C (see also FIG. 15), as illustrated in FIG. 16, if it is determined in step S21 that the power-off operation was performed in the sleep state Q2, execution proceeds to step S22 (S22C).

In step S22C, three kinds of measurement data are acquired. One is measurement data on the power holdable period P2 (specifically, its period length M). The remaining two are measurement data on times required for the initialization (including restart-up) of devices in the halt state (initialization required times), and measurement data on times required for the process of acquiring save target information of the devices in the halt state (acquisition process required times). The measurement unit 18 (see FIG. 13) acquires the three kinds of measurement data. For example, data obtained by actual measurements in step S16 described below in the power supply continuing period P1 following the previous power-off operation when the previous power-off operation (another power-off operation performed before the present power-off operation) is performed is simply required to be used as measurement data on the initialization required times and the acquisition process required times. The measurement data is stored once in the eMMC 33 at the time of the measurements (step S16 immediately after the previous power-off operation), and read out and acquired from the eMMC 33 in step S22 (step S22 immediately after the present power-off operation). When each piece of the measurement data is not yet stored in the eMMC 33, a preset value (default value) is simply required to be used.

In step S23 (S23C), in accordance with the period length M of the power holdable period P2, one of the three lists L21, L22, and L23 illustrated in FIG. 12 is determined to be the device list L2. However, the thresholds TH1, TH2, and TH3 are changed in synchronization with the measurement value of the total time Z based on the measurement data of the initialization required times and the acquisition process required times. For example, the threshold TH1 is simply required to be set to a value obtained by adding the predetermined margin (margin value) Δt to (the same value as) the value Z21 that is reflective of the measurement results (TH1=Z21+Δt). The same shall apply to the other thresholds TH2 and TH3.

Execution then returns to FIG. 15 again to execute the operations of steps S12 to S15. Furthermore, in step S16, the time required for the initialization process in step S12 executed following the present power-off operation is measured on a device-by-device basis, and stored in the eMMC 33. Moreover, the time required for the snapshot acquisition process in step S14 executed following the present power-off operation is also measured on a device-by-device basis, and stored in the eMMC 33. The measurement values are acquired in step S22 upon the next and later power-off operations, and used.

Furthermore, when the next power-on operation is performed, such operation as illustrated in FIG. 11 (step S50) is executed.

According to the above modes, similar effects to those of the second embodiment can be obtained. Moreover, the thresholds TH1, TH2, and TH3 are determined in synchronization with actual measurement values of the times required for the initialization process; accordingly, the devices targeted for the snapshot acquisition process can be determined more appropriately considering also the actual circumstances of the initialization process. Furthermore, the thresholds TH1, TH2, and TH3 are determined in synchronization with the actual measurement values of the times required for the snapshot acquisition process; accordingly, the devices targeted for the snapshot acquisition process can be determined more appropriately considering also the actual circumstances of the snapshot acquisition process.

For example, data obtained by actual measurements in step S16 (see FIG. 15) in the power supply continuing period P1 following the previous power-off operation when the previous power-off operation (another power-off operation performed before the present power-off operation) is performed is simply required to be used as the measurement data of the power holdable period P2. Specifically, a difference value between the time when the self-powered unit 38 starts supplying power in the power supply continuing period P1 (battery power supply start time) and the time when an output voltage of the self-powered unit 38 decreases to or below a predetermined level (battery power supply end time) (=battery power supply end time−battery power supply start time) may be calculated as the power holdable period P2. The measurement data related to the power holdable period P2 is simply required to be stored once in the eMMC 33 at the time of the measurements (step S16 immediately after the previous power-off operation) and read out and acquired from the eMMC 33 afterward (step S22 immediately after the present power-off operation). The same shall apply to the second embodiment and the like.

<4. Fourth Embodiment>

In the second embodiment, the mode is illustrated by example in which when the power-off operation is performed in the sleep state Q2, the limited version device list L2 (specifically, one of the device lists L21, L22, and L23 (see FIG. 12)) is selected (step S22 (FIG. 14)). However, the present invention is not limited to this. For example, it may be configured such that the full version device list L1 can be selected if such a condition as described below is satisfied.

In the fourth embodiment, a mode is illustrated by example in which even when the power-off operation is performed in the sleep state Q2, if a predetermined condition holds true, a third snapshot acquisition process and the like with the device list L1, instead of the second snapshot acquisition process and the like, are executed. Specifically, even when the power-off operation is performed in the sleep state Q2, if it is determined that the initialization process on all halting devices and the third snapshot acquisition process on the first device group can be finished within the power holdable period P2, the initialization process on all the halting devices and the third snapshot acquisition process on the first device group, instead of the initialization process on some of the halting devices and the second snapshot acquisition process on the second device group, are executed. The initialization process on all the halting devices is the initialization process on all of two or more devices (five devices 21 to 25) that are halting at the time of the power-off operation (the sleep state Q2). Moreover, the third snapshot acquisition process is the process of storing save target information related to all devices (six devices 20 and 21 to 25) of the first device group as snapshot data in the eMMC 33.

More specifically, when the power-off operation is performed in the sleep state Q2, the devices targeted for the initialization process (reinitialization process) and the devices targeted for the snapshot acquisition process are determined such that the above-mentioned condition C2 is satisfied. However, the devices targeted for the snapshot acquisition process and the like are all or part of the plurality of devices included in the first device group.

Figure 17:
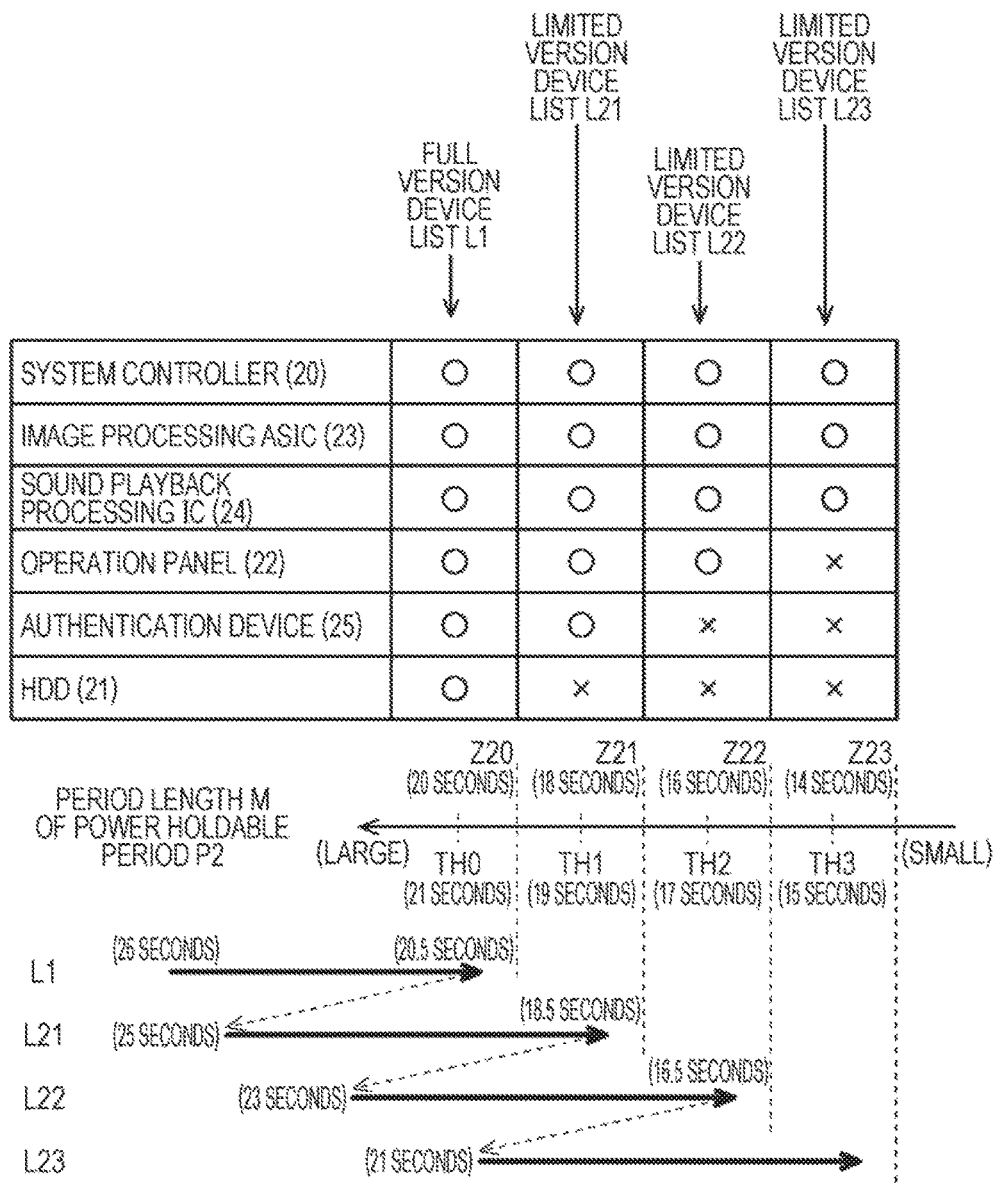
FIG. 17 is a diagram illustrating device lists and the like according to a fourth embodiment.

FIG. 17 is a similar diagram to FIG. 12. In the fourth embodiment, as illustrated in FIG. 17, not only the limited version device lists L21, L22, and L23 but also the full version device list L1 (also expressed as L20) can be selected as the device list (target device list) L specifying the devices targeted for the snapshot acquisition process and the like.

Specifically, all the six devices 20 and 21 to 25 are listed as the devices targeted for the snapshot acquisition process in the device list L1 (L20). A total time Z (Z1) of the sum of times required for the initialization process on five devices 21 to 25, which halt in the sleep state Q2, of the devices 20 and 21 to 25 targeted for the snapshot acquisition process, and the sum of times required for the snapshot acquisition process on the devices 20 and 21 to 25 targeted for the snapshot acquisition process is a value Z20.

Four values Z20, Z21, Z22, and Z23 are in a magnitude relation of Z20>Z21>Z22>Z23.

In this manner, in the fourth embodiment, the device lists L20 (L1), L21, L22, and L23 of four levels where their total required times Z are different from each other are created in advance and stored in advance in the eMMC 33.

Moreover, the device lists L20, L21, L22, and L23 of the plurality of levels (here, four levels) are ranked (priorities are set) in advance in this order. Specifically, the device list L20 is ranked the highest, the device list L21 is ranked second, the device list L22 is ranked third, and the device list L23 is ranked the lowest. Moreover, a relatively smaller number of devices (that are narrowed down) are specified as the target device group as the device lists L20, L21, L22, and L23 are ranked a relatively lower place (set a lower priority) (as the ranking decreases).

A list that is fit to be adopted as the device list L is determined from the four device lists L20 (L1), L21, L22, and L23.

Firstly, it is determined whether or not the device list L20 (possessing the highest priority) is adopted as the device list L based on a magnitude relation between the period length M of the power supply holdable period P2 corresponding to the device list L20 and a threshold TH0. The power holdable period P2 corresponding to the device list L20 is a period during which the self-powered unit 38 can continue supplying power (in a state where the supply of power from the AC power supply is lost) while the initialization process on five devices 21 to 25 included in the device list L20 and the saving process on six devices 20 and 21 to 25 included in the device list L20 are executed. Moreover, the threshold TH0 is a value obtained by adding the predetermined margin (margin value) Δt to the value Z20 (here, TH0=Z20+Δt). A case where Z20=20 seconds, Z21=18 seconds, Z22=16 seconds, Z23=14 seconds, and Δt=1 second is described below.

Specifically, when the self-powered unit 38 is not yet deteriorated and still has a sufficient storage capacity, for example, in the early stage of use of the MFP 10, the period length M of the power holdable period P2 corresponding to the device list L20 is determined to be larger than the threshold TH0. For example, the period length M of the power holdable period P2 is estimated to be 26 seconds (M=26 seconds), and the period length M is determined to be larger than the threshold TH0 (21 seconds). In this case, the device list L20 (L1) is determined to be the device list L. The snapshot acquisition process (that is, the third snapshot acquisition process) and the like are executed on the target devices included in the determined device list L20. More specifically, the MFP 10 executes the initialization process on all the halting devices (the five devices 21 to 25) and the third snapshot acquisition process on the first device group (specifically, all the devices (the six devices 20 and 21 to 25)). In other words, even when the power-off operation is performed in the sleep state Q2, if it is determined that the initialization process on all the halting devices and the third snapshot acquisition process on the first device group can be finished within the power holdable period P2, the MFP 10 executes the initialization process and the third snapshot acquisition process, instead of the second snapshot acquisition process.

Furthermore, upon the next power-on operation, the above-mentioned processing of step S50 is executed.

The period length M of the power holdable period P2 then gradually decreases with the aged deterioration of the self-powered unit 38. At some point in time, the period length M of the power supply holdable period P2 decreases to a value (for example, "20.5 seconds") smaller than the threshold TH0 (21 seconds). At this point in time, a difference (0.5 seconds) between the period length M (20.5 seconds) and the value Z20 (20 seconds) is smaller than the margin value Δt (one second); accordingly, the MFP 10 judges that it is not preferable to keep the device list L20 (L1) as the device list L (it may be difficult to execute the initialization process on all the halting devices and the third snapshot acquisition process). The MFP 10 determines that the device list L21 of the next level, instead of the device list L20 (L1), is a new device list L. In other words, it is determined that "the second snapshot acquisition process with the device list L2, instead of the third snapshot acquisition process and the like with the device list L1, is required to be executed." In this manner, while it is determined that the third snapshot acquisition process and the like can be executed, the third snapshot acquisition process and the like are executed. On the other hand, if it is determined that it may be difficult to execute the third snapshot acquisition process and the like, then the second snapshot acquisition process is executed in turn.

The device list L21 of the next level includes a relatively smaller number of devices than the previous device list L20. Accordingly, the amount of power consumed is reduced according to the reduction in the number of devices. Consequently, the period length M of the power holdable period P2 corresponding to the device list L21 increases temporarily. The period length M increases to, for example, approximately 25 seconds. Consequently, the period length M of the power holdable period P2 has a relatively large difference (margin) from the value Z21 (18 seconds). Accordingly, it is possible to ensure the end of the snapshot acquisition process. The power holdable period P2 corresponding to the device list L21 is a period during which the self-powered unit 38 can continue supplying power after the initialization process on four devices 22 to 25 included in the device list L21 and the saving process on five devices 20 and 22 to 25 included in the device list L21 are executed.

Similar operation to that of the second embodiment is performed from this point on when the period length M of the power holdable period P2 decreases with the aged deterioration of the self-powered unit 38. In other words, device lists L2 (for example, L22 and L23), through which the number of devices is gradually reduced, are in turn adopted according to the decrease in the period length M of the power holdable period P2.

The four thresholds TH0, TH1, TH2, and TH3 have the following magnitude relation, that is, TH0>TH1>TH2>TH3. Moreover, in terms of the selection of the device list L1 or L2, when M=TH0 holds true (when equality is attained), the device list L1 or L2 may be determined to be the device list L2.

As described above, firstly, the device list L1 including the largest number of (here, six) target devices is selected from the four device lists L1, L21, L22, and L23. If the difference value (M−Z) between the period length M of the power holdable period P2 corresponding to the device list L1 and the total time Z corresponding to the device list L1 is larger than the predetermined value (Δt), it is determined that the third snapshot acquisition process and the like are required to be executed with the device list L1. On the other hand, if the difference value (M−Z) between the period length M of the power holdable period P2 corresponding to the device list L1 and the total time Z corresponding to the device list L1 is smaller than the predetermined value (Δt), it is determined that the device list L2, instead of the device list L1, is the device list L that is fit to be adopted. In other words, it is determined that the initialization process and the second snapshot acquisition process (instead of the third snapshot acquisition process and the like) are required to be executed with the device list L21 including a relatively small number of (here, five) target devices.

Similar operation to that of the second embodiment and the like is executed afterward according to the deterioration of the storage capacity of the self-powered unit 38.

In this manner, one device list is selected from the four device lists L1, L21, L22, and L23. Specifically, one device list is selected which specifies a device group (a combination of devices) where the corresponding total time Z falls within the period length M of the corresponding power holdable period P2 (the total time Z is equal to or less than the period length M) (and which includes a relatively large number of devices) is selected. In other words, a combination (a combination of devices) where the corresponding total time Z does not exceed the corresponding period length M is selected from the four kinds of combinations.

The device group included in the selected device list is determined to be the devices targeted for the snapshot acquisition process. For example, if the device list L1 is selected, all the devices 20 and 21 to 25 included in the device list L1 are determined to be the devices targeted for the snapshot acquisition process. Moreover, in the device group included in the selected device list, devices that halt in the sleep state Q2 are determined to be the devices targeted for the initialization process (reinitialization process). For example, if the device list L1 is selected, the devices 21 to 25, which halt in the sleep state Q2, of all the devices 20 and 21 to 25 included in the device list L1 are determined to be the devices targeted for the initialization process.

With such operation, even when the power-off operation is performed in the sleep state Q2, if it is determined that the third snapshot acquisition process and the like can be finished within the power holdable period P2, the third snapshot acquisition process and the like, instead of the second snapshot acquisition process and the like, are executed. Therefore, a relatively fast start-up operation (see times T31 to T33 in FIG. 4) based on data acquired in the third snapshot acquisition process (a faster start-up operation than a start-up operation based on the second snapshot acquisition process) can be preferentially performed.

Moreover, a combination (a combination of devices) where the corresponding total time Z does not exceed the corresponding period length M is selected from the plurality of combinations (the plurality of device lists L2). Accordingly, similar effects to those of the second embodiment can be obtained.

The idea according to the fourth embodiment can be applied not only to the second embodiment but also to the third embodiment. In other words, the thresholds TH0, TH1, TH2, and TH3 in the fourth embodiment may be determined in synchronization with the actual measurement values of the times required for the initialization process and/or the actual measurement values of the times required for the snapshot acquisition process.

<5. Modifications, Etc.>

Up to this point the embodiments of the present invention have been described. However, the present invention is not limited to the contents described above.

For example, in the first embodiment, at the time (time T28) when a predetermined period of time has passed since the time of the power-off operation (time T21), the self-powered unit 38 stops supplying power. However, the present invention is not limited to this. For example, at the time when the snapshot acquisition process actually ends (and also at the time when the actual measurement data is stored in the eMMC 33 in step S16 (see FIG. 15)), the self-powered unit 38 may stop supplying power immediately. In this manner, the end time of the power supply continuing period P1 (that is, the period length of the power supply continuing period P1) may change according to the progress of the snapshot acquisition process.

Moreover, in the above embodiments, the mode where the supply of power to the system controller 20 continues even in the sleep state Q2 is described. However, the present invention is not limited to this. For example, the supply of power to some devices (sub-devices) in the system controller 20 may stop in the sleep state Q2. In this case, when the power-off operation is performed in the sleep state Q2, some devices (sub-devices targeted for the stop of the power supply) in the system controller 20 may be handled similarly to the above devices 21 to 25, and also devices (remaining devices that are not targeted for the stop of the power supply) exclusive of the some devices (sub-devices) in the system controller 20 may be handled similarly to the device 20 in the above embodiments.

For example, in step S12 (see, for example, FIG. 9), the initialization process only on some (sub-devices targeted for the stop of the power supply) of a plurality of sub-devices in the system controller 20 may be performed with the initialization process on the other devices (for example, 23 and 24).

Moreover, in step S14 (see, for example, FIG. 9), the snapshot acquisition process on all target sub-devices (both of the some sub-devices and the remaining sub-devices) in the system controller 20 may be performed with the snapshot acquisition process on the other devices (for example, 23 and 24).

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
   a nonvolatile storage device configured to store save target information related to the image forming apparatus as snapshot data in a power supply continuing period from a time of a power-off operation to a time of interruption of power supply; and
   a hardware processor configured to reduce a start-up time by means of the snapshot data upon the next power-on operation being performed after the power-off operation, and accordingly start up the image forming apparatus fast, wherein
   the hardware processor
     upon the power-off operation being performed in a first working state of the image forming apparatus, executes a first snapshot acquisition process of storing save target information related to a first device group of the image forming apparatus as the snapshot data in the storage device, and
     upon the power-off operation being performed in a second working state where power consumption is less than the first working state due to the halt of two or more devices in the first device group, after an initialization process is executed on some of the two or more devices halting at the time of the power-off operation, executes a second snapshot acquisition process of storing save target information related to a second device group narrowed down from the first device group, the second device group including some devices from the first device group and excluding the some of the two or more devices halting at the time of the power-off operation, as the snapshot data in the storage device.

2. The image forming apparatus according to claim 1, wherein the hardware processor determines the second device group such that a total of a sum of times required for the initialization process on the some of the two or more devices and a sum of times required for the process of acquiring the save target information related to the devices of the second device group falls within a period length of the power supply continuing period.

3. The image forming apparatus according to claim 2, wherein the hardware processor
   selects one combination of a plurality of combinations, related to target device groups for the second snapshot acquisition process, where a total time of a sum of times required for the initialization process on at least one device targeted for the initialization process in a target device group included in each combination and a sum of times required for the process of acquiring save target information of the target device group for the second snapshot acquisition process is specified and associated, the one combination having the total time falling within the period length of the power supply continuing period, and
   determines a device group included in the selected combination to be the second device group.

4. The image forming apparatus according to claim 2, further comprising a power storage unit configured to supply electric power that is stored prior to the power-off operation to each unit of the image forming apparatus in the power supply continuing period after the time of the power-off operation, wherein the hardware processor estimates a period length of a power holdable period being a period during which the power storage unit is able to supply power, and determines the period length of the power supply continuing period based on the period length of the power holdable period.

5. The image forming apparatus according to claim 4, wherein the hardware processor determines the second device group based on ranked device lists of a plurality of levels where as the ranking decreases to a relatively lower place, a relatively smaller number of devices are specified as a target device group.

6. The image forming apparatus according to claim 5, wherein the hardware processor
   upon it being determined that the period length of the power holdable period is longer than a total time of a sum of times required for the initialization process on halting devices of a target device group specified in a high-ranking device list being a device list with a relatively high ranking among the device lists of the plurality of levels and a sum of times required for the process of acquiring save target information of the target device group, and a difference between the period length of the power holdable period and the total time is larger than a predetermined level, determines the target device group specified in the high-ranking device list to be the second device group, and also determines the halting devices of the target device group specified in the higher-ranking device list to be the some devices, and
   upon the difference between the period length of the power holdable period and the total time being determined to be smaller than the predetermined level, determines a target device group specified in a lower-ranking device list being a device list with a lower ranking than the high-ranking device list among the device lists of the plurality of levels to be the second device group, and also determines halting devices of the target device group specified in the lower-ranking device list to be the some devices.

7. The image forming apparatus according to claim 2, wherein the hardware processor includes a measurement unit configured to measure an initialization required time being a time required for initialization of each of the some devices, wherein the hardware processor obtains a sum of the times required for the initialization process on the some devices based on the initialization required times measured by the measurement unit upon another power-off operation performed before the power-off operation being performed in the second working state.

8. The image forming apparatus according to claim 2, wherein the hardware processor includes a measurement unit configured to measure an acquisition process required time being a time required for the process of acquiring the save target information of each device of the second device group, wherein the hardware processor obtains a sum of the times required for the process of acquiring the save target information related to the second device group based on the acquisition process required times measured by the measurement unit upon another power-off operation performed before the power-off operation being performed in the second working state.

9. The image forming apparatus according to claim 1, wherein the second device group is a device group further excluding a subset of remaining devices from the first device group that remain after excluding the some of the two or more devices.

10. The image forming apparatus according to claim 9, wherein at the time of the next power-on operation after the power-off operation is performed in the second working state, the hardware processor restores, in the image forming apparatus, the snapshot data acquired in the second snapshot acquisition process on the second device group, and also executes the initialization process on the remaining devices.

11. The image forming apparatus according to claim 1, further comprising a power storage unit configured to supply electric power that is stored prior to the power-off operation to each unit of the image forming apparatus in the power supply continuing period after the time of the power-off operation, wherein the hardware processor
estimates a period length of a power holdable period being a period during which the power storage unit is able to supply power, and
even in a case where the power-off operation is performed in the second working state, upon the initialization process on all of the two or more devices halting at the time of the power-off operation, and a third snapshot acquisition process of storing save target information related to all the devices of the first device group as the snapshot data in the storage device being determined to be able to be finished within the power holdable period, executes the initialization process on the two or more devices and the third snapshot acquisition process on the first device group, instead of the initialization process on the some devices and the second snapshot acquisition process on the second device group.

12. A non-transitory recording medium storing a computer readable program causing a computer built in an image forming apparatus to execute the steps of:
a) storing save target information related to the image forming apparatus as snapshot data in a nonvolatile storage device in the image forming apparatus in a power supply continuing period from a time of a power-off operation to a time of interruption of power supply; and
b) reducing a start-up time by means of the snapshot data upon the next power-on operation being performed after the power-off operation, and accordingly starting up the image forming apparatus fast, wherein
the step a) includes the steps of:
a-1) upon the power-off operation being performed in a first working state of the image forming apparatus, executing a first snapshot acquisition process of storing save target information related to a first device group of the image forming apparatus as the snapshot data in the storage device; and
a-2) upon the power-off operation being performed in a second working state where power consumption is less than the first working state due to the halt of two or more devices in the first device group, after an initialization process is executed on some of the two or more devices halting at the time of the power-off operation, executing a second snapshot acquisition process of storing save target information related to a second device group narrowed down from the first device group, the second device group including some devices from the first device group and excluding the some of the two or more devices halting at the time of the power-off operation, as the snapshot data in the storage device.

13. The non-transitory recording medium storing a computer readable program according to claim 12, wherein the step a-2) includes a step of a-2-1) determining the second device group such that a total of a sum of times required for the initialization process on the some of the two or more devices and a sum of times required for the process of acquiring the save target information related to the devices of the second device group falls within a period length of the power supply continuing period.

14. The non-transitory recording medium storing a computer readable program according to claim 13, wherein the step a-2-1) includes the steps of:
selecting one combination of a plurality of combinations, related to target device groups for the second snapshot acquisition process, where a total time of a sum of times required for the initialization process on at least one device targeted for the initialization process in a target device group included in each combination and a sum of times required for the process of acquiring save target information of the target device group for the second snapshot acquisition process is specified and associated, the one combination having the total time falling within the period length of the power supply continuing period; and
determining a device group included in the selected combination to be the second device group.

15. The non-transitory recording medium storing a computer readable program according to claim 13, wherein the step a-2) further includes a step of a-2-2) estimating a period length of a power holdable period being a period during which a power storage unit of the image forming apparatus is able to supply power to each unit of the image forming apparatus, and determining the period length of the power supply continuing period based on the period length of the power holdable period.

16. The non-transitory recording medium storing a computer readable program according to claim 15, wherein the step a-2-2) includes determining the second device group based on ranked device lists of a plurality of levels where as the ranking decreases to a relatively lower place, a relatively smaller number of devices are specified as a target device group.

17. The non-transitory recording medium storing a computer readable program according to claim 16, wherein the step a-2-2) includes
upon it being determined that the period length of the power holdable period is longer than a total time of a sum of times required for the initialization process on halting devices of a target device group specified in a high-ranking device list being a device list with a relatively high ranking among the device lists of the plurality of levels and a sum of times required for the process of acquiring save target information of the target device group, and a difference between the period length of the power holdable period and the total time is larger than a predetermined level, determining the target device group specified in the high-ranking device list to be the second device group, and also determining the halting devices of the target device group specified in the higher-ranking device list to be the some devices, and upon the difference between the period length of the power holdable period and the total time being determined to be smaller than the predetermined level, determining a target device group specified in a lower-ranking device list being a device list with a lower ranking than the high-ranking device list among the device lists of the plurality of levels to be the second device group, and also determining halting devices of the target device group specified in the lower-ranking device list to be the some devices.

18. The non-transitory recording medium storing a computer readable program according to claim 13, wherein the program causing the computer to further execute a step of c) upon another power-off operation performed before the power-off operation in the step a) being performed in the second working sate, measuring an initialization required time being a time required for initialization of each of the some devices, wherein the step a-2) includes a step of a-2-3) obtaining a sum of the times required for the initialization process on the some devices based on the initialization required times measured in the step c).

19. The non-transitory recording medium storing a computer readable program according to claim 13, wherein the program causing the computer to further execute a step of d) upon another power-off operation performed before the power-off operation in the step a) being performed in the second working state, measuring an acquisition process required time being a time required for the process of acquiring save target information of each device of the second device group, wherein the step a-2) includes a step of a-2-4) obtaining a sum of the times required for the process of acquiring the save target information related to the second device group based on the acquisition process required times measured in the step d).

20. The non-transitory recording medium storing a computer readable program according to claim 12, wherein the second device group is a device group further excluding a subset of remaining devices from the first device group that remain after excluding the some of the two or more devices, from the first device group.

21. The non-transitory recording medium storing a computer readable program according to claim 20, wherein the step b) includes a step of restoring, in the image forming apparatus, the snapshot data acquired in the second snapshot acquisition process on the second device group, and also executing the initialization process on the remaining devices, at the time of the next power-on operation after the power-off operation is performed in the second working state.

22. The non-transitory recording medium storing a computer readable program according to claim 12, wherein the step a-2) includes estimating a period length of a power holdable period being a period during which a power storage unit of the image forming apparatus is able to supply power to each unit of the image forming apparatus, and even in a case where the power-off operation is performed in the second working state, upon the initialization process on all of the two or more devices halting at the time of the power-off operation, and a third snapshot acquisition process of storing save target information related to all the devices of the first device group as the snapshot data in the storage device being determined to be able to be finished within the power holdable period, and executing the initialization process on the two or more devices and the third snapshot acquisition process on the first device group, instead of the initialization process on the some devices and the second snapshot acquisition process on the second device group.

* * * * *